(12) United States Patent
Harman et al.

(10) Patent No.: US 8,328,522 B2
(45) Date of Patent: Dec. 11, 2012

(54) AXIAL FLOW FAN

(75) Inventors: Jayden David Harman, San Rafael, CA (US); Kimberly Penney, Emeryville, CA (US); Paul Lees, San Francisco, CA (US); Onno Koelman, San Anselmo, CA (US)

(73) Assignee: Pax Scientific, Inc., Grass Valley, CA (US)

( * ) Notice: Subject to any disclaimer, the term of this patent is extended or adjusted under 35 U.S.C. 154(b) by 1333 days.

(21) Appl. No.: 11/906,060

(22) Filed: Sep. 28, 2007

(65) Prior Publication Data

US 2008/0145230 A1 Jun. 19, 2008

Related U.S. Application Data

(60) Provisional application No. 60/827,677, filed on Sep. 29, 2006, provisional application No. 60/950,610, filed on Jul. 19, 2007.

(51) Int. Cl.
*F03B 3/12* (2006.01)

(52) U.S. Cl. .................. 416/223 R; 29/889.21

(58) Field of Classification Search .............. 416/223 R, 416/DIG. 2; 29/889.21, 889.7, 889.71
See application file for complete search history.

(56) References Cited

U.S. PATENT DOCUMENTS

| | | | |
|---|---|---|---|
| 11,544 A | 8/1854 | Andrews |
| 700,785 A | 5/1902 | Kull |
| 794,926 A | 7/1905 | Crawford |
| 871,825 A | 11/1907 | Schupmann |
| 879,583 A | 2/1908 | Pratt |
| 943,233 A | 12/1909 | Boyle |
| 965,135 A | 7/1910 | Gibson |
| 969,101 A | 8/1910 | Gibson |
| 1,023,225 A | 4/1912 | Shlosberg |
| 1,272,180 A | 7/1918 | Andresen |
| 1,353,478 A | 9/1920 | Jeffries, Sr. |
| 1,356,676 A | 10/1920 | Weller et al. |
| 1,396,583 A | 11/1921 | Krafve |
| 1,471,697 A | 10/1923 | Kubes |
| 1,505,893 A | 8/1924 | Hunter et al. |
| 1,658,126 A | 2/1928 | Jehle |
| 1,667,186 A | 4/1928 | Bluehdorn |
| 1,709,217 A | 4/1929 | Hamilton |
| 1,713,047 A | 5/1929 | Maxim |
| 1,729,018 A | 9/1929 | Siders |
| 1,756,916 A | 4/1930 | Stranahan |
| 1,799,039 A | 3/1931 | Conejos |
| 1,812,413 A | 6/1931 | Reynolds |
| 1,816,245 A | 7/1931 | Wolford |

(Continued)

FOREIGN PATENT DOCUMENTS

AU 62946/96 2/1997

(Continued)

OTHER PUBLICATIONS

Stephen J. Schoonmaker, The CAD Guideboook: A Basic Manual for Understanding and Improving Computer-Aided Design, 2004, Taylor & Francis e-Library, pp. 128-139, 226 and 236-239.*

(Continued)

*Primary Examiner* — Dwayne J White
(74) *Attorney, Agent, or Firm* — Lewis and Roca LLP

(57) ABSTRACT

A fan or rotor design where the surface profile may be configured to desired dimensions particular to a given operating environment is disclosed.

23 Claims, 15 Drawing Sheets

U.S. PATENT DOCUMENTS

| | | | |
|---|---|---|---|
| 1,872,075 A | 8/1932 | Dolza | |
| 1,891,170 A | 12/1932 | Nose | |
| 1,919,250 A | 7/1933 | Olson | |
| 2,068,686 A | 1/1937 | Lascroux | |
| 2,085,796 A | 7/1937 | Fritsch | |
| 2,139,736 A | 12/1938 | Durham | |
| 2,165,808 A | 7/1939 | Murphy | |
| 2,210,031 A | 8/1940 | Greene | |
| 2,359,365 A | 10/1944 | Katcher | |
| 2,879,861 A | 3/1959 | Belsky et al. | |
| 2,908,344 A | 10/1959 | Maruo | |
| 2,912,063 A | 11/1959 | Barnes | |
| 2,958,390 A | 11/1960 | Montague | |
| 3,066,755 A | 12/1962 | Diehl | |
| 3,071,159 A | 1/1963 | Coraggioso | |
| 3,076,480 A | 2/1963 | Vicard | |
| 3,081,826 A | 3/1963 | Loiseau | |
| 3,082,695 A | 3/1963 | Buschhorn | |
| 3,215,165 A | 11/1965 | Broadway | |
| 3,232,341 A | 2/1966 | Woodworth | |
| 3,339,631 A | 9/1967 | McGurty | |
| 3,371,472 A | 3/1968 | Krizman, Jr. | |
| 3,407,995 A | 10/1968 | Kinsworthy | |
| 3,584,701 A | 6/1971 | Freeman | |
| 3,692,422 A | 9/1972 | Girardier | |
| 3,800,951 A | 4/1974 | Mourlon | |
| 3,927,731 A | 12/1975 | Lancaster | |
| 3,940,060 A | 2/1976 | Viets | |
| 3,957,133 A | 5/1976 | Johnson | |
| 3,964,841 A | 6/1976 | Strycek | |
| 4,050,539 A | 9/1977 | Kashiwara et al. | |
| 4,182,596 A | 1/1980 | Wellman | |
| 4,206,783 A | 6/1980 | Brombach | |
| 4,211,183 A | 7/1980 | Hoult | |
| 4,225,102 A | 9/1980 | Frosch et al. | |
| 4,299,553 A | 11/1981 | Swaroop | |
| 4,317,502 A | 3/1982 | Harris et al. | |
| 4,323,209 A | 4/1982 | Thompson | |
| 4,331,213 A | 5/1982 | Taniguchi | |
| 4,505,297 A | 3/1985 | Leech et al. | |
| 4,533,015 A | 8/1985 | Kojima | |
| 4,540,334 A | 9/1985 | Stahle | |
| 4,579,195 A | 4/1986 | Nieri | |
| 4,644,135 A | 2/1987 | Daily | |
| 4,679,621 A | 7/1987 | Michele | |
| 4,685,534 A | 8/1987 | Burstein et al. | |
| 4,699,340 A | 10/1987 | Rethorst | |
| 4,823,865 A | 4/1989 | Hughes | |
| 4,834,142 A | 5/1989 | Johannessen | |
| 4,993,487 A | 2/1991 | Niggemann | |
| 5,010,910 A | 4/1991 | Hickey | |
| 5,040,558 A | 8/1991 | Hickey et al. | |
| 5,052,442 A | 10/1991 | Johannessen | |
| 5,058,837 A | 10/1991 | Wheeler | |
| 5,100,242 A | 3/1992 | Latto | |
| 5,139,215 A | 8/1992 | Peckham | |
| 5,181,537 A | 1/1993 | Powers | |
| 5,207,397 A | 5/1993 | Ng et al. | |
| 5,220,955 A | 6/1993 | Stokes | |
| 5,249,993 A | 10/1993 | Martin | |
| 5,261,745 A | 11/1993 | Watkins | |
| 5,312,224 A | 5/1994 | Batchelder et al. | |
| 5,320,493 A * | 6/1994 | Shih et al. | 416/223 R |
| 5,337,789 A | 8/1994 | Cook | |
| 5,382,092 A | 1/1995 | Okamoto et al. | |
| 5,624,229 A | 4/1997 | Kotzur et al. | |
| 5,661,638 A | 8/1997 | Mira | |
| 5,741,118 A | 4/1998 | Shinbara et al. | |
| 5,787,974 A | 8/1998 | Pennington | |
| 5,844,178 A | 12/1998 | Lothringen | |
| 5,891,148 A | 4/1999 | Deckner | |
| 5,934,612 A | 8/1999 | Gerhardt | |
| 5,934,877 A | 8/1999 | Harman | |
| 5,943,877 A | 8/1999 | Chen | |
| 5,954,124 A | 9/1999 | Moribe et al. | |
| 6,050,772 A | 4/2000 | Hatakeyama et al. | |
| 6,179,218 B1 | 1/2001 | Gates | |
| 6,241,221 B1 | 6/2001 | Wegner et al. | |
| 6,273,679 B1 | 8/2001 | Na | |
| 6,374,858 B1 | 4/2002 | Hides et al. | |
| 6,382,348 B1 | 5/2002 | Chen | |
| 6,385,967 B1 | 5/2002 | Chen | |
| 6,415,888 B2 | 7/2002 | An et al. | |
| 6,484,795 B1 | 11/2002 | Kasprzyk | |
| 6,604,906 B2 | 8/2003 | Ozeki | |
| 6,623,838 B1 | 9/2003 | Nomura et al. | |
| 6,632,071 B2 | 10/2003 | Pauly | |
| 6,669,142 B2 | 12/2003 | Saiz | |
| 6,684,633 B2 | 2/2004 | Jett | |
| D487,800 S | 3/2004 | Chen et al. | |
| 6,702,552 B1 | 3/2004 | Harman | |
| 6,817,419 B2 | 11/2004 | Reid | |
| 6,892,988 B2 | 5/2005 | Hugues | |
| 6,932,188 B2 | 8/2005 | Ni | |
| D509,584 S | 9/2005 | Li et al. | |
| 6,959,782 B2 | 11/2005 | Brower et al. | |
| 7,117,973 B2 | 10/2006 | Graefenstein | |
| D539,413 S | 3/2007 | Parker et al. | |
| 2002/0000720 A1 | 1/2002 | Knowles | |
| 2004/0037986 A1 | 2/2004 | Houston et al. | |
| 2004/0238163 A1 | 12/2004 | Harman | |
| 2004/0244853 A1 | 12/2004 | Harman | |
| 2005/0011700 A1 | 1/2005 | Dadd | |
| 2005/0269458 A1 | 12/2005 | Harman | |
| 2006/0102239 A1 | 5/2006 | Harman | |
| 2006/0249283 A1 | 11/2006 | Harman | |
| 2007/0003414 A1 | 1/2007 | Harman | |
| 2007/0025846 A1 | 2/2007 | Harman | |

FOREIGN PATENT DOCUMENTS

| | | |
|---|---|---|
| DE | 003315258 | 10/1984 |
| EP | 14257 | 8/1980 |
| EP | 0598253 | 5/1994 |
| FR | 2534981 A | 10/1982 |
| FR | 2666031 A | 2/1992 |
| GB | 873135 | 7/1961 |
| GB | 2057567 A | 4/1981 |
| GB | 2 063 365 A | 6/1981 |
| JP | 98264 | 6/1932 |
| JP | S54129699 | 10/1979 |
| JP | 05332121 | 12/1993 |
| JP | 00257610 | 9/2000 |
| JP | 2000257610 | 9/2000 |
| JP | D1243052 | 6/2005 |
| SU | 738566 | 6/1980 |
| SU | 850104 | 7/1981 |
| SU | 1030631 | 7/1983 |
| TW | 565374 | 3/2002 |
| TW | M287387 | 2/2006 |
| WO | WO 81/03201 | 11/1981 |
| WO | WO 87 07048 A | 11/1987 |
| WO | WO 89 08750 A | 9/1989 |
| WO | WO 00/38591 | 7/2000 |
| WO | WO 01 14782 | 3/2001 |
| WO | WO 03 056228 A | 7/2003 |
| WO | WO 03056269 A1 | 7/2003 |
| WO | WO 2005/045258 | 5/2005 |
| WO | WO 2005/073561 | 8/2005 |

OTHER PUBLICATIONS

Derwent Abstract Accession No. 87-318963/45, SU 1291726 A (Makeevka Eng Cons) Feb. 23, 1987.

Derwent Abstract Accession No. 99-249047/32, JP 11072104 A (Saito Jidosha Shatai Kogyo KK) Mar. 16, 1999.

Patent Abtracts of Japan, Publication No. 2000-168632, Jun. 20, 2000, "Low Air Resistance Vehicle Body Using Vortex Ring."

Derwent Abstract Accession No. 97-198067/18, JP 09053787 A (Kajima Corp) Feb. 25, 1997.

Derwent Abstract Accession No. 97-546288/50, JP 09264462 A (Sekisui Chem Ind Co Ltd) Oct. 7, 1997.

Derwent Abstract Accession No. 1999-380417/32, JP 11148591 A (TLV Co Ltd) Jun. 2, 1999.

Derwent Abstract Accession No. E6575C/21, SU 687306A (Leningrad Forestry Acad) Sep. 28, 1977.

Derwent Abstract Accession No. N8420 E/42, SU 887876 A (As Ukr Hydromechani) Dec. 7, 1981.

Derwent Abstract Accession No. 85-073498/12, SU 1110986 A (Korolev A S) Aug. 30, 1984.
Derwent Abstract Accession No. 89-075095/10, SU 1418540 A (As Ukr Hydrodynamic) Aug. 23, 1988.
Derwent Abstract Accession No. 91-005279, SU 1560887 A (Sredaztekhenergo En) Apr. 30, 1990.
Derwent Abstract Accession No. 93-375668/47, SU 1756724 A (Odess Poly) Aug. 30, 1992.
Derwent Abstract Accession No. L0015B/47, SE 7803739 A (Ingenjorsfirma Garl) Nov. 5, 1979.
Dr. Knott, Ron, "The Golden Section Ration: Phi," Available at http://www.mcs.surrey.ac.uk/Personal/R.Knott/Fibonacci/phi.html.
Derwent Abstract Accession No. 89-157673, SU 1437579A (Lengd Kalinin Poly) Nov. 15, 1988.
K. Foster et al., "Fluidics Components and Circuits," Wiley-Interschience, London, 1971, pp. 219-221.
Karassik et al "Pump Handbook" pub. 1976 by McGraw-Hill, Inc.
McLarty et al., "Phi Geometry: Impeller & Propeller Design for Fluids Handling", Offshore Magazine, pp. 123—Oct. 1999.
Derwent Abstract Accession No. K2273W/37, SU 431850 A (Fishing Ind Exp), (Apr. 1975).
Derwent Abstract Accession No. 51960 E/25, SU 858896 A (Onatskii P A), (Aug. 1981).
Merriam-Webster Online Dictionary, 2010 http://www.merriam-webster.com/dictionary/spiral, Feb. 23, 2010, two pages.
Merriam-Webster Online Dictionary, 2010 http://www.merriam-webster.com/dictionary/curve, Feb. 23, 2010, two pages.
Merriam-Webster Online Dictionary, 2010 http://www.merriam-webster.com/dictionary/vortex, Feb. 23, 2010, two pages.
Merriam-Webster Online Dictionary, 2010 http://www.merriam-webster.com/dictionary/vortical, Feb. 23, 2010, two pages.
The CAD Guidebook, A Basic Manual for Understanding and Improving Computer-Aided Design, Stephen J. Schoonmaker, Marcel Dekker, Inc., New York, 2002.
Batchelor, G. K., "An Introduction to Fluid Dynamics", Cambridge Mathematical Library, 2000.

* cited by examiner

AXIAL FLOW FAN

CROSS-REFERENCE TO RELATED APPLICATIONS

The present application claims the priority benefit of U.S. provisional patent application No. 60/827,677 filed Sep. 29, 2006 and entitled "Axial Flow Fan" and U.S. provisional patent application No. 60/950,610 filed Jul. 19, 2007 and entitled "Surface Profile for a Quiet Rotor or Stator." The disclosure of these commonly owned applications are incorporated herein by reference.

This application is related to U.S. Pat. No. 5,934,877 for a "Rotor with Logarithmic Scaled Shape" and U.S. Pat. No. 6,702,552 for an "Impeller Having Blade(s) Conforming to the Golden Section of a Logarithmic Curve." The disclosures of these commonly owned patents are incorporated herein by reference.

BACKGROUND OF THE INVENTION

1. Field of the Invention

The present invention generally concerns axial flow fans and rotors. More specifically, the present invention concerns a surface profile for axial flow fans and rotors used in environments requiring high output in conjunction with constrained fan size including but not limited to electronics cooling.

2. Description of the Related Art

Fan and rotor design has undergone little change over the past century. As a result, fans and rotors remain relatively inefficient. A part of this inefficiency is the result of fans and rotors generating a considerable amount of noise and turbulence. Similarly, fans and rotors used in liquid environments typically result in cavitation. Noise, turbulence, and cavitation reduce the operational efficiency of the fan and rotor.

A chart illustrating inefficiencies with respect to flow and sound in a series of 92×38 mm computer fans as found in the prior art are shown in FIG. 1A. A similar chart illustrating inefficiencies with respect to flow and torque in prior art fan design is shown in FIG. 1B. FIG. 1B illustrates, specifically, a 22" best-in-class A/C fan with a standard bell shroud operating at 850 rpm.

Much of the noise, turbulence, and unwanted torque in prior art fan design may be attributable to the surface design of the fan or rotor. In many instances, fans and rotors are implemented in a particular operating environment based on a pre-existing design. These pre-existing designs are not necessarily designed or intended for that particular operating environment. Nevertheless, these pre-existing designs may achieve results that are adequate or 'good enough' for that particular environment.

Determining which pre-existing design is adequate or 'good enough' for a particular environment is a never-ending exercise. Trial and error will continually redefine the best adequate or 'good enough' design implementation. Notwithstanding these adequate results, some degree of the aforementioned noise, turbulence, and/or unwanted torque will inevitably remain.

There is, therefore, a need in the art for fan and rotor design where the surface profile may be configured to desired dimensions particular to a given operating environment.

SUMMARY OF THE INVENTION

Embodiments of the present invention provide for an axial flow fan that is quieter for the same or better output through- out a range of operating points compared to prior art fan designs. References to an axial flow fan or any fan are meant to be inclusive with respect to rotors and other blade designs.

In one exemplary embodiment, a method for constructing an axial fan is disclosed. In this exemplary method, a spline is drafted to connect a plurality of points along a radius cut sketch to form a blade surface. The blade surface is then offset by a constant amount and filled to form a single blade. The single blade is oriented with respect to a hub and patterned along with a total number of blades to be affixed to the hub. The single blade and remaining blades are then attached to the hub.

In another embodiment, a fan apparatus is disclosed. The fan apparatus includes a hub a blade coupled to the hub, the blade including a blade surface. The blade surface is created by drafting a spline to connect a plurality of points along a radius cut sketch. The blade is created by offsetting the blade surface by a constant amount and filling the blade surface to form a single blade.

Another exemplary method provides for constructing an axial fan. The exemplary method includes drafting a spline to connect a plurality of points along a radius cut sketch to form a blade surface. A complimentary airfoil shape is then created. The airfoil is then lofted into a solid.

A computer-readable storage medium is also disclosed. The medium has embodied thereon a program being executable by a processor to perform a method for constructing an axial fan.

DETAILED DESCRIPTION

Figure 1A:
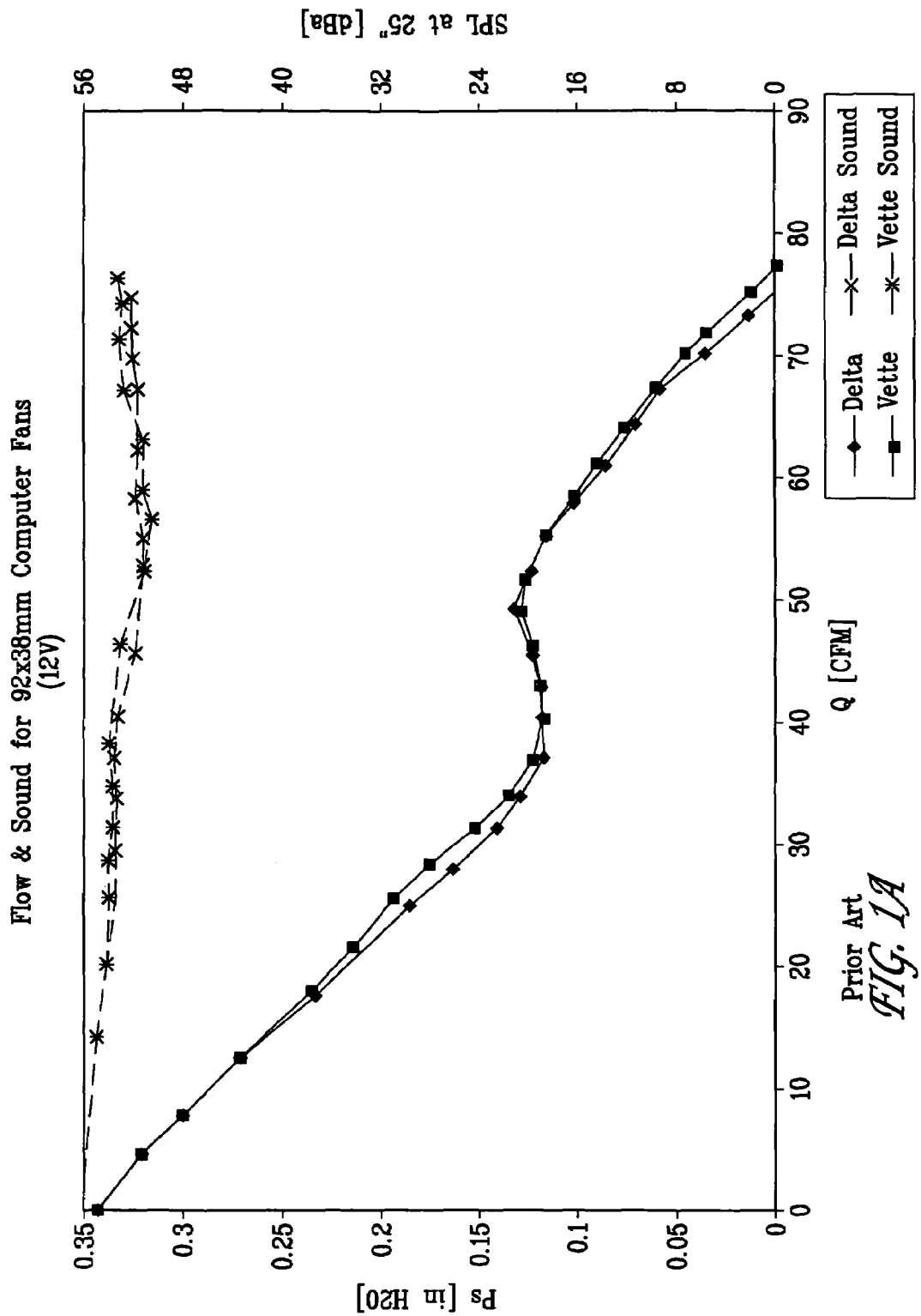
FIG. 1A is a chart exhibiting flow and sound inefficiencies in prior art fan design.
Figure 1B:
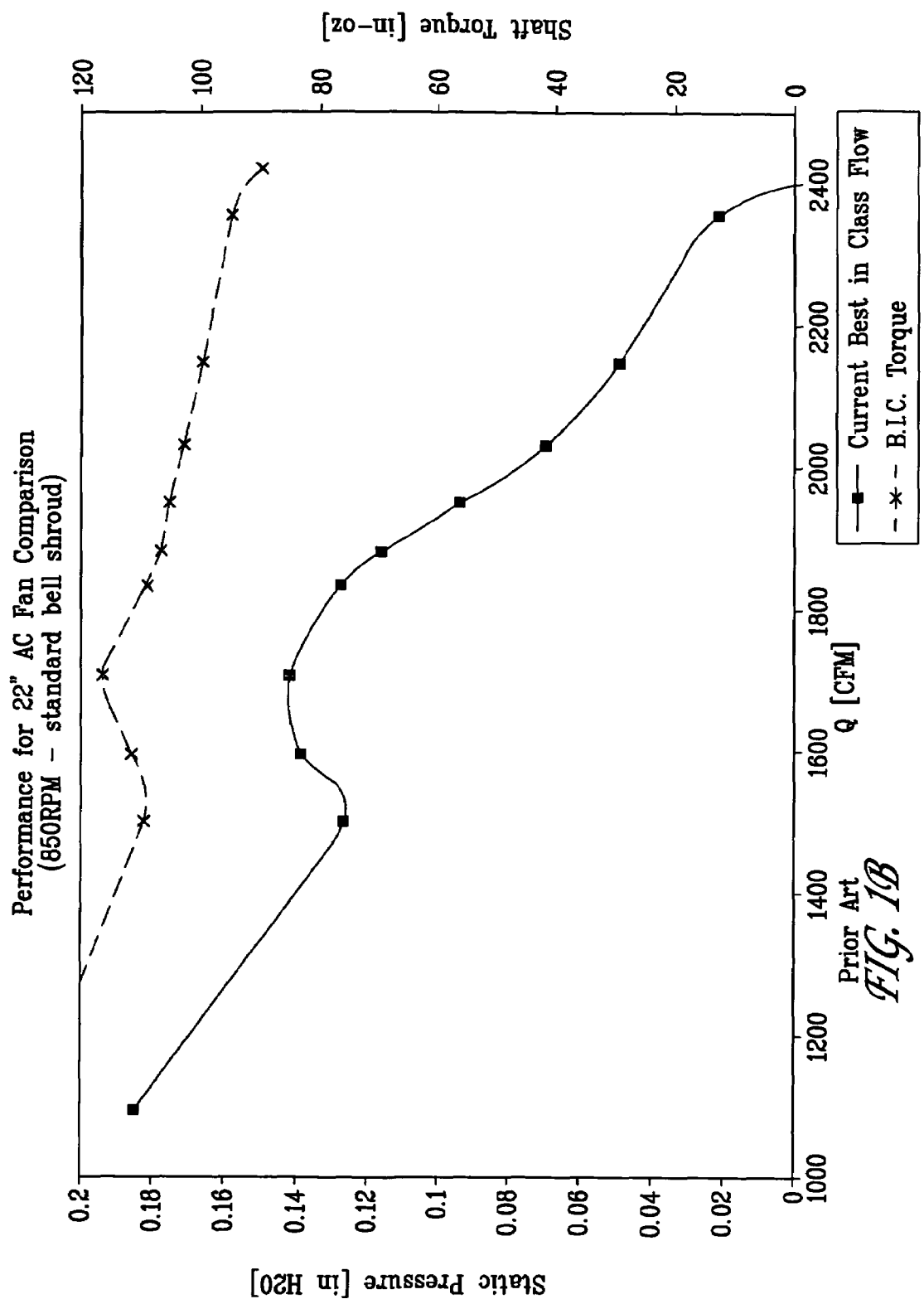
FIG. 1B is a chart exhibiting flow and torque inefficiencies in prior art fan design.
Figure 2A:
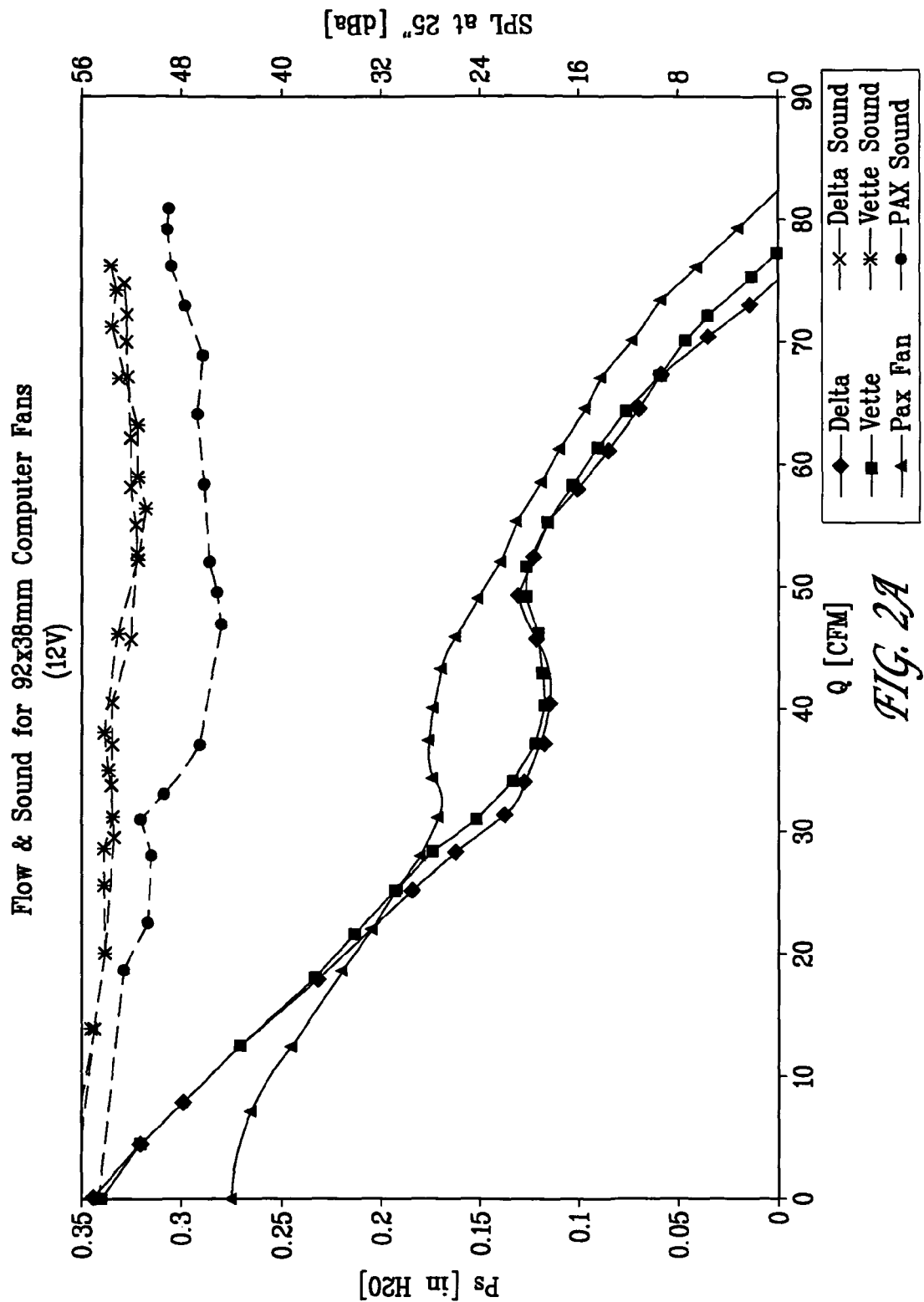
FIG. 2A is a chart exhibiting flow and sound efficiency of a fan as may be designed in accordance with an exemplary embodiment of the present invention as compared to the inefficiencies of prior art fans like those shown in FIG. 1A.
Figure 2B:
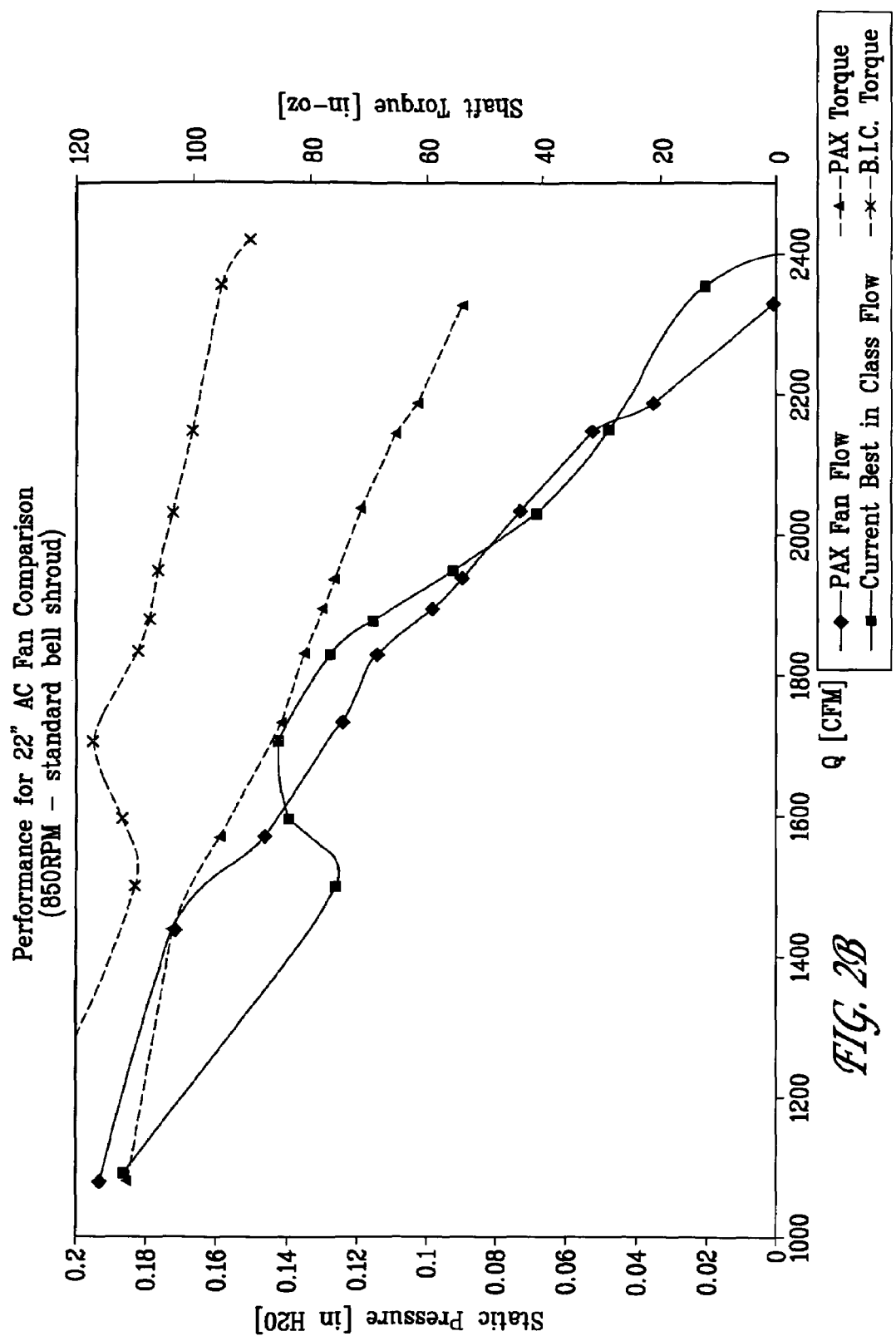
FIG. 2B is a chart exhibiting flow and torque efficiency of a fan as may be designed in accordance with an exemplary embodiment of the present invention as compared to the inefficiencies of a prior art fan like that shown in FIG. 1B.

Embodiments of the present invention provide for a fan that is quieter for the same or better output throughout a range of operating points compared to prior art fan designs. FIG. 2A is a chart exhibiting flow and sound efficiency of an exemplary fan as may be designed in accordance with the present invention compared to the inefficiencies of a prior art fan like that found in FIG. 1A. FIG. 2B, in turn, is a chart exhibiting flow and torque efficiency of an exemplary surface profile as may be designed for a fan in accordance with the present invention compared to the inefficiencies of a prior art fan like that found in FIG. 1B.

Figure 3:
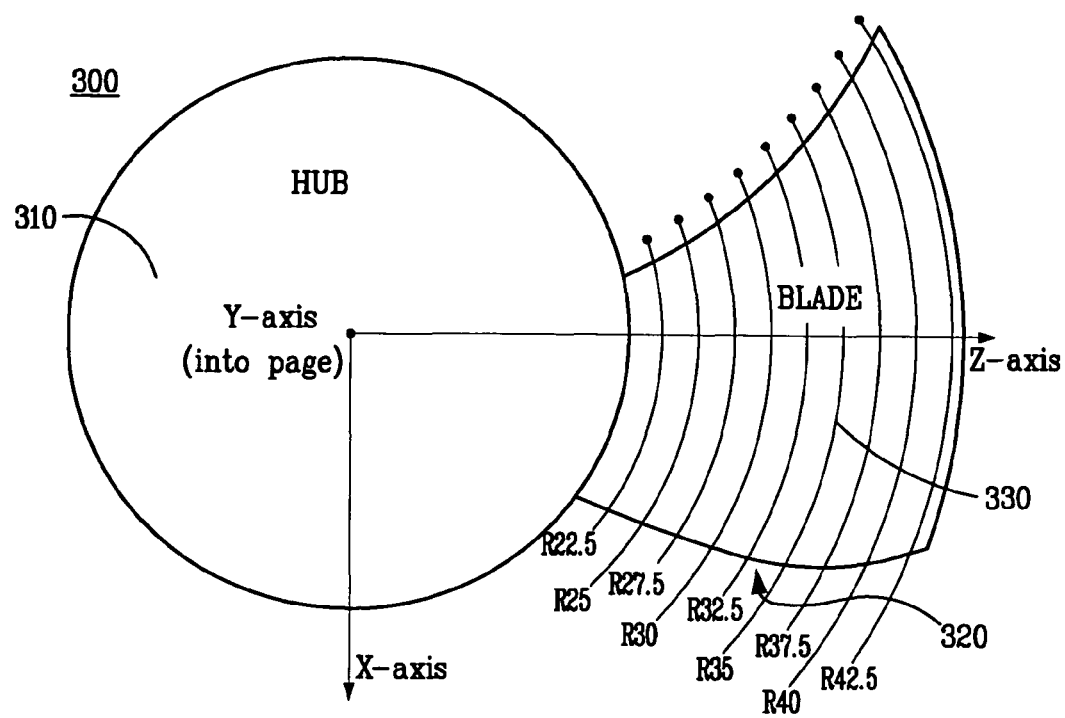
FIG. 3 illustrates an exemplary fan and surface profile according to an embodiment of the present invention.

FIG. 3 illustrates a portion of an exemplary fan 300 and surface profile 330 according to an embodiment of the present invention. Fan 300 may be motor driven or subject to the natural flow of a fluid (e.g., liquid or gas). Fan 300 includes a hub 310, which may be approximately cylindrical or conical in shape. Hub 310 may be hollowed like that of FIG. 9A or solid as is shown in FIG. 10E. Hub 310 may also include a cap like that shown in FIG. 9B. Hub 310 may be altered with radii, chamfers, and/or blends with symmetry about the Y-axis as illustrated throughout FIGS. 9 and 10. Hub 310 may be configured to an appropriate height and diameter in order to incorporate a desired motor and hub-tip ratio as illustrated throughout FIGS. 9 and 10.

Blades 320 are circularly patterned around hub 310. Blades 320 may be permanently or temporarily coupled or affixed to the hub 310 through various techniques as known in the art. The surface profile 330 of blades 320 may be configured in accordance with the various profiles described in U.S. Pat. Nos. 5,934,877 and 6,702,552, the disclosure of which has been previously incorporated herein by reference. For example, a portion of the surface profile 330 of fan blade 320 may conform to a logarithmic spiral. The radius of that particular logarithmic spiral may unfold at a constant order of growth when measured at equiangular radii, which may sometimes be referred to as the Golden Section.

Surface profile 330 configurations may also correspond to external or internal shell configurations as found in nature. For example, the surface profile 330 of blade 320 may conform to the shell of the phylum Mollusca, class Cephalopoda, genus *Nautilus*. An alternative surface profile-to-shell configuration may be inclusive of the shell shaping of the phylum Mollusca, class Gastropoda, genus *Conus, Conidae, Turbinidea*, or *Volutidae*. Shell configurations from other members of phylum Mollusca, class Gastropoda or Cephalopoda may also be implemented with respect to the surface profile 330 of blade 320.

Various other surface configurations may be implemented in accordance with embodiments of the present invention. For example, surface profile 330 of blade 320 may be defined by the following tables. In Tables I-IX, Cartesian points are taken at even intervals along the span of the blade, which corresponds to an 87 mm diameter fan. In the context of FIG. 3, axis Y represents the hub axis and serves as the zero reference for all radial measurements. All dimensions in Tables I-IX are in millimeters. The blade surface may be constructed through a method like that disclosed in the context of FIG. 5.

TABLE I

| 22.5 mm Radius | | | |
|---|---|---|---|
| Pt # | X | Y | Z |
| 1 | −5.389 | −2.463 | 21.845 |
| 2 | −2.804 | −0.447 | 22.325 |
| 3 | −1.548 | 0.621 | 22.447 |
| 4 | −0.338 | 1.725 | 22.497 |
| 5 | 4.187 | 6.381 | 22.107 |
| 6 | 6.236 | 8.883 | 21.619 |
| 7 | 8.171 | 11.467 | 20.964 |

TABLE I-continued

| 22.5 mm Radius | | | |
|---|---|---|---|
| Pt # | X | Y | Z |
| 8 | 9.981 | 14.098 | 20.165 |
| 9 | 11.645 | 16.791 | 19.252 |
| 10 | 12.675 | 18.611 | 18.590 |

TABLE II

| 25 mm Radius | | | |
|---|---|---|---|
| Pt # | X | Y | Z |
| 1 | −6.755 | −3.085 | 24.070 |
| 2 | −5.230 | −1.984 | 24.447 |
| 3 | −3.708 | −0.850 | 24.723 |
| 4 | −2.209 | 0.344 | 24.902 |
| 5 | −0.743 | 1.590 | 24.989 |
| 6 | 0.680 | 2.866 | 24.991 |
| 7 | 2.072 | 4.159 | 24.914 |
| 8 | 4.740 | 6.826 | 24.547 |
| 9 | 7.203 | 9.653 | 23.940 |
| 10 | 9.536 | 12.571 | 23.110 |
| 11 | 11.695 | 15.578 | 22.096 |
| 12 | 13.656 | 18.668 | 20.941 |

TABLE III

| 27.5 mm Radius | | | |
|---|---|---|---|
| Pt # | X | Y | Z |
| 1 | −8.339 | −3.663 | 26.205 |
| 2 | −6.681 | −2.508 | 26.676 |
| 3 | −5.014 | −1.334 | 27.039 |
| 4 | −3.379 | −0.118 | 27.292 |
| 5 | −1.774 | 1.140 | 27.443 |
| 6 | −0.200 | 2.438 | 27.499 |
| 7 | 1.360 | 3.757 | 27.466 |
| 8 | 2.898 | 5.107 | 27.347 |
| 9 | 4.395 | 6.508 | 27.147 |
| 10 | 5.841 | 7.963 | 26.873 |
| 11 | 7.233 | 9.452 | 26.532 |
| 12 | 9.896 | 12.488 | 25.658 |
| 13 | 12.351 | 15.634 | 24.571 |
| 14 | 14.594 | 18.869 | 23.308 |

TABLE IV

| 30 mm Radius | | | |
|---|---|---|---|
| Pt # | X | Y | Z |
| 1 | −10.052 | −4.175 | 28.266 |
| 2 | −8.259 | −2.972 | 28.841 |
| 3 | −6.454 | −1.744 | 29.298 |
| 4 | −2.895 | 0.799 | 29.860 |
| 5 | −1.145 | 2.119 | 29.978 |
| 6 | 0.589 | 3.464 | 29.994 |
| 7 | 2.300 | 4.847 | 29.912 |
| 8 | 3.968 | 6.289 | 29.736 |
| 9 | 5.597 | 7.786 | 29.473 |
| 10 | 7.177 | 9.315 | 29.129 |
| 11 | 10.171 | 12.444 | 28.223 |
| 12 | 11.578 | 14.055 | 27.676 |
| 13 | 12.919 | 15.705 | 27.076 |
| 14 | 15.426 | 19.108 | 25.730 |

TABLE V

32.5 mm Radius

| Pt # | X | Y | Z |
|---|---|---|---|
| 1 | −11.904 | −4.628 | 30.241 |
| 2 | −8.077 | −2.121 | 31.480 |
| 3 | −6.134 | −0.832 | 31.916 |
| 4 | −4.200 | 0.476 | 32.227 |
| 5 | −0.387 | 3.180 | 32.498 |
| 6 | 3.326 | 6.035 | 32.329 |
| 7 | 5.121 | 7.551 | 32.094 |
| 8 | 6.879 | 9.111 | 31.764 |
| 9 | 10.229 | 12.302 | 30.848 |
| 10 | 13.307 | 15.645 | 29.651 |
| 11 | 16.096 | 19.177 | 28.234 |

TABLE VI

35 mm Radius

| Pt # | X | Y | Z |
|---|---|---|---|
| 1 | −13.944 | −5.042 | 32.102 |
| 2 | −11.950 | −3.756 | 32.897 |
| 3 | −9.913 | −2.465 | 33.567 |
| 4 | −7.835 | −1.168 | 34.112 |
| 5 | −5.747 | 0.160 | 34.525 |
| 6 | −1.625 | 2.908 | 34.962 |
| 7 | 2.419 | 5.778 | 34.916 |
| 8 | 4.393 | 7.286 | 34.723 |
| 9 | 6.319 | 8.865 | 34.425 |
| 10 | 10.022 | 12.110 | 33.535 |
| 11 | 11.778 | 13.779 | 32.959 |
| 12 | 13.453 | 15.502 | 32.311 |
| 13 | 15.045 | 17.284 | 31.602 |
| 14 | 16.552 | 19.129 | 30.839 |

TABLE VII

37.5 mm Radius

| Pt # | X | Y | Z |
|---|---|---|---|
| 1 | −16.217 | −5.442 | 33.812 |
| 2 | −14.137 | −4.107 | 34.733 |
| 3 | −12.003 | −2.783 | 35.527 |
| 4 | −9.813 | −1.473 | 36.193 |
| 5 | −7.592 | −0.132 | 36.724 |
| 6 | −3.163 | 2.655 | 37.366 |
| 7 | 1.205 | 5.545 | 37.481 |
| 8 | 3.361 | 7.039 | 37.349 |
| 9 | 5.468 | 8.607 | 37.099 |
| 10 | 7.519 | 10.247 | 36.738 |
| 11 | 9.510 | 11.916 | 36.274 |
| 12 | 11.447 | 13.606 | 35.710 |
| 13 | 13.311 | 15.339 | 35.058 |
| 14 | 15.077 | 17.149 | 34.335 |
| 15 | 16.736 | 19.050 | 33.558 |

TABLE VIII

40 mm Radius

| Pt # | X | Y | Z |
|---|---|---|---|
| 1 | −18.694 | −5.801 | 35.363 |
| 2 | −16.540 | −4.436 | 36.420 |
| 3 | −14.332 | −3.083 | 37.344 |
| 4 | −12.065 | −1.755 | 38.137 |
| 5 | −9.759 | −0.412 | 38.791 |
| 6 | −7.428 | 0.970 | 39.304 |
| 7 | −5.073 | 2.390 | 39.677 |
| 8 | −0.382 | 5.301 | 39.998 |

TABLE VIII-continued

40 mm Radius

| Pt # | X | Y | Z |
|---|---|---|---|
| 9 | 4.225 | 8.324 | 39.776 |
| 10 | 6.454 | 9.943 | 39.476 |
| 11 | 8.614 | 11.644 | 39.062 |
| 12 | 10.707 | 13.380 | 38.540 |
| 13 | 12.752 | 15.132 | 37.913 |
| 14 | 14.711 | 16.945 | 37.197 |
| 15 | 16.538 | 18.880 | 36.421 |

TABLE IX

42.5 mm Radius

| Pt # | X | Y | Z |
|---|---|---|---|
| 1 | −21.317 | −6.090 | 36.767 |
| 2 | −19.109 | −4.701 | 37.962 |
| 3 | −16.842 | −3.324 | 39.020 |
| 4 | −12.129 | −0.612 | 40.732 |
| 5 | −9.709 | 0.774 | 41.376 |
| 6 | −7.262 | 2.199 | 41.875 |
| 7 | −2.365 | 5.103 | 42.434 |
| 8 | 0.080 | 6.575 | 42.500 |
| 9 | 2.514 | 8.074 | 42.426 |
| 10 | 4.912 | 9.640 | 42.215 |
| 11 | 7.231 | 11.300 | 41.880 |
| 12 | 9.460 | 13.033 | 41.434 |
| 13 | 11.633 | 14.797 | 40.877 |
| 14 | 13.759 | 16.584 | 40.211 |
| 15 | 15.754 | 18.503 | 39.472 |

Figure 4:
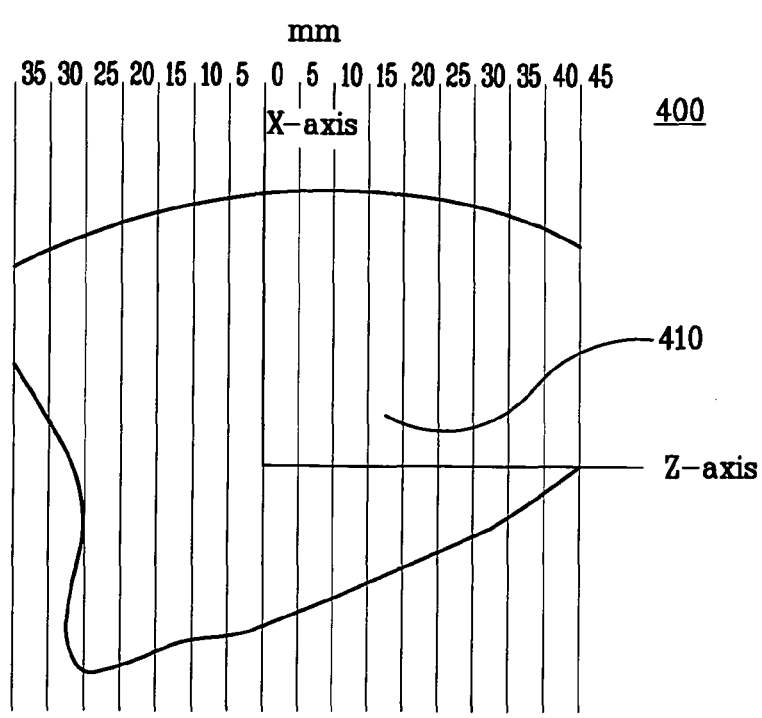
FIG. 4 illustrates an exemplary surface profile of a fan blade according to an alternative embodiment of the present invention.

FIG. 4 illustrates an exemplary surface profile 410 of a fan blade 400 according to an alternative embodiment of the present invention. Surface profile 410 may correspond to a blade coupled or affixed to a hub like the fan 300 shown in FIG. 3. The surface profile 410 of fan blade 400 in FIG. 4 has been defined by the Cartesian points as referenced in Tables X-XXVI (below) and taken at even intervals along the axis of the fan blade 400. The X, Y, and Z axis are orthogonal to one another and oriented as shown in FIG. 4. Like tables I-IX, all dimensions are in millimeters.

TABLE X z = 0 mm

| X | Y |
|---|---|
| −15.143 | −23.188 |
| −14.326 | −22.832 |
| −13.543 | −22.424 |
| −12.092 | −21.431 |
| −10.769 | −20.241 |
| −9.567 | −18.931 |
| −8.467 | −17.536 |
| −7.442 | −16.078 |
| −5.577 | −13.054 |
| −3.900 | −9.921 |
| −2.423 | −6.683 |
| −1.140 | −3.369 |
| 0.000 | 0.000 |
| 1.470 | 5.110 |
| 2.078 | 7.697 |
| 2.576 | 10.311 |
| 3.158 | 15.563 |
| 3.063 | 20.820 |
| 2.698 | 23.451 |
| 2.425 | 24.763 |
| 2.094 | 26.055 |
| 0.214 | 31.012 |
| −0.392 | 32.199 |

TABLE X-continued z = 0 mm

| X | Y |
|---|---|
| −1.055 | 33.364 |
| −2.543 | 35.567 |
| −4.264 | 37.579 |
| −6.176 | 39.433 |

TABLE XI z = 5 mm

| X | Y |
|---|---|
| −11.448 | −21.282 |
| −10.262 | −20.347 |
| −9.220 | −19.270 |
| −8.278 | −18.093 |
| −7.405 | −16.861 |
| −5.804 | −14.307 |
| −4.345 | −11.667 |
| −3.026 | −8.955 |
| −1.861 | −6.181 |
| −0.828 | −3.356 |
| 0.111 | −0.493 |
| 1.605 | 4.777 |
| 2.219 | 7.445 |
| 2.718 | 10.142 |
| 3.285 | 15.559 |
| 3.152 | 20.975 |
| 2.756 | 23.684 |
| 2.464 | 25.033 |
| 2.110 | 26.361 |
| 0.100 | 31.441 |
| −0.550 | 32.655 |
| −1.259 | 33.838 |
| −2.848 | 36.059 |
| −4.681 | 38.070 |
| −6.717 | 39.906 |

TABLE XII z = 10 mm

| X | Y |
|---|---|
| −9.055 | −19.049 |
| −8.218 | −18.097 |
| −7.448 | −17.100 |
| −6.051 | −15.004 |
| −4.790 | −12.815 |
| −3.650 | −10.566 |
| −1.700 | −5.933 |
| −0.091 | −1.161 |
| 1.427 | 4.243 |
| 2.559 | 9.716 |
| 3.150 | 15.287 |
| 3.183 | 18.115 |
| 3.003 | 20.923 |
| 1.906 | 26.433 |
| 1.465 | 27.782 |
| 0.961 | 29.098 |
| −0.226 | 31.637 |
| −1.658 | 34.046 |
| −2.476 | 35.197 |
| −3.368 | 36.305 |
| −5.342 | 38.334 |
| −7.510 | 40.159 |

TABLE XIII z = 15 mm

| X | Y |
|---|---|
| −7.636 | −16.833 |
| −6.407 | −15.142 |
| −5.294 | −13.382 |
| −3.400 | −9.666 |
| −1.841 | −5.788 |
| −0.520 | −1.823 |
| 1.028 | 3.721 |
| 2.187 | 9.359 |
| 2.794 | 15.067 |
| 2.623 | 20.801 |
| 2.171 | 23.646 |
| 1.454 | 26.416 |
| 0.460 | 29.106 |
| −0.142 | 30.420 |
| −0.810 | 31.697 |
| −4.123 | 36.335 |
| −5.129 | 37.364 |
| −6.209 | 38.335 |
| −8.496 | 40.128 |

TABLE XIV z = 20 mm

| X | Y |
|---|---|
| −6.748 | −14.747 |
| −5.797 | −13.336 |
| −4.930 | −11.879 |
| −3.443 | −8.825 |
| −1.117 | −2.431 |
| 0.442 | 3.175 |
| 1.607 | 8.854 |
| 2.225 | 14.633 |
| 2.247 | 17.565 |
| 2.033 | 20.472 |
| 1.556 | 23.345 |
| 1.212 | 24.767 |
| 0.793 | 26.176 |
| −1.576 | 31.479 |
| −3.193 | 33.910 |
| −4.118 | 35.055 |
| −5.109 | 36.129 |
| −7.282 | 38.061 |
| −9.650 | 39.775 |

TABLE XV z = 25 mm

| X | Y |
|---|---|
| −6.097 | −12.664 |
| −5.414 | −11.525 |
| −4.785 | −10.362 |
| −3.674 | −7.973 |
| −1.861 | −3.015 |
| −0.288 | 2.627 |
| 0.863 | 8.346 |
| 1.461 | 14.168 |
| 1.463 | 17.118 |
| 1.220 | 20.041 |
| 0.706 | 22.931 |
| −0.102 | 25.770 |
| −1.196 | 28.484 |
| −2.586 | 31.057 |
| −3.400 | 32.287 |
| −4.294 | 33.466 |
| −6.282 | 35.609 |
| −8.535 | 37.464 |
| −10.991 | 39.098 |

TABLE XVI z = 30 mm

| X | Y |
|---|---|
| −5.585 | −10.399 |
| −4.067 | −7.100 |
| −2.804 | −3.695 |
| −1.189 | 1.944 |
| −0.064 | 7.667 |
| 0.486 | 13.491 |
| 0.463 | 16.449 |
| 0.189 | 19.383 |
| −0.363 | 22.272 |
| −0.751 | 23.699 |
| −1.217 | 25.108 |
| −3.828 | 30.353 |
| −4.679 | 31.560 |
| −5.615 | 32.715 |
| −7.690 | 34.793 |
| −10.027 | 36.564 |
| −12.561 | 38.097 |

TABLE XVII z = 35 mm

| X | Y |
|---|---|
| −5.162 | −7.551 |
| −4.098 | −4.761 |
| −2.368 | 0.873 |
| −1.217 | 6.608 |
| −0.708 | 12.454 |
| −0.704 | 13.936 |
| −0.758 | 15.427 |
| −1.060 | 18.379 |
| −1.647 | 21.280 |
| −2.058 | 22.709 |
| −2.552 | 24.119 |
| −3.772 | 26.814 |
| −5.307 | 29.331 |
| −6.199 | 30.519 |
| −7.177 | 31.651 |
| −9.340 | 33.665 |
| −11.769 | 35.341 |
| −14.399 | 36.754 |

TABLE XVIII z = 40 mm

| X | Y |
|---|---|
| −4.536 | −2.789 |
| −3.114 | 2.520 |
| −2.292 | 7.928 |
| −2.135 | 10.675 |
| −2.170 | 13.441 |
| −2.907 | 18.884 |
| −3.250 | 20.222 |
| −3.664 | 21.546 |
| −4.704 | 24.098 |
| −6.028 | 26.505 |
| −6.800 | 27.653 |
| −7.645 | 28.755 |
| −9.517 | 30.760 |
| −11.648 | 32.479 |
| −14.038 | 33.894 |
| −16.570 | 35.051 |

TABLE XIX z = 45 mm

| X | Y |
|---|---|
| −3.952 | 5.610 |
| −3.744 | 9.858 |
| −4.047 | 14.086 |
| −4.411 | 16.191 |
| −4.929 | 18.258 |
| −6.455 | 22.212 |
| −6.949 | 23.159 |
| −7.488 | 24.086 |
| −8.690 | 25.845 |
| −10.056 | 27.471 |
| −11.599 | 28.952 |
| −13.298 | 30.240 |
| −15.124 | 31.311 |
| −17.062 | 32.195 |
| −19.063 | 32.962 |

TABLE XX z = −5 mm

| X | Y |
|---|---|
| −19.764 | −24.408 |
| −18.389 | −24.124 |
| −17.077 | −23.624 |
| −14.607 | −22.303 |
| −12.354 | −20.650 |
| −11.318 | −19.698 |
| −10.354 | −18.686 |
| −7.038 | −14.217 |
| −5.603 | −11.812 |
| −4.294 | −9.345 |
| −2.231 | −4.690 |
| −0.511 | 0.098 |
| 0.964 | 5.079 |
| 2.097 | 10.148 |
| 2.738 | 15.274 |
| 2.712 | 20.412 |
| 2.387 | 22.987 |
| 2.136 | 24.271 |
| 1.829 | 25.537 |
| 0.074 | 30.408 |
| −0.494 | 31.579 |
| −1.117 | 32.730 |
| −2.524 | 34.917 |
| −4.159 | 36.924 |
| −5.979 | 38.785 |

TABLE XXI z = −10 mm

| X | Y |
|---|---|
| −21.148 | −24.550 |
| −19.540 | −23.946 |
| −17.984 | −23.240 |
| −15.006 | −21.576 |
| −13.608 | −20.570 |
| −12.302 | −19.447 |
| −9.977 | −16.914 |
| −8.556 | −14.998 |
| −7.262 | −13.011 |
| −4.973 | −8.872 |
| −3.030 | −4.542 |
| −1.367 | −0.074 |
| 0.131 | 4.783 |
| 1.301 | 9.730 |
| 2.016 | 14.737 |
| 2.087 | 19.764 |
| 1.814 | 22.288 |

TABLE XXI-continued z = −10 mm

| X | Y |
|---|---|
| 1.591 | 23.550 |
| 1.314 | 24.796 |
| −0.307 | 29.601 |
| −1.426 | 31.897 |
| −2.762 | 34.067 |
| −4.328 | 36.060 |
| −6.086 | 37.906 |

TABLE XXII z = −15 mm

| X | Y |
|---|---|
| −21.794 | −24.790 |
| −20.175 | −23.944 |
| −18.591 | −23.032 |
| −17.082 | −22.071 |
| −15.621 | −21.055 |
| −12.915 | −18.773 |
| −10.552 | −16.093 |
| −8.510 | −13.142 |
| −5.128 | −6.869 |
| −3.707 | −3.589 |
| −2.436 | −0.232 |
| −0.930 | 4.469 |
| 0.255 | 9.261 |
| 1.019 | 14.115 |
| 1.181 | 18.994 |
| 0.970 | 21.446 |
| 0.540 | 23.894 |
| −0.937 | 28.601 |
| −1.982 | 30.851 |
| −3.246 | 32.984 |
| −4.740 | 34.943 |
| −6.430 | 36.756 |

TABLE XXIII z = −20 mm

| X | Y |
|---|---|
| −22.214 | −26.282 |
| −20.683 | −24.942 |
| −19.172 | −23.578 |
| −17.670 | −22.205 |
| −16.180 | −20.819 |
| −14.728 | −19.392 |
| −13.353 | −17.905 |
| −10.889 | −14.728 |
| −8.742 | −11.328 |
| −6.831 | −7.765 |
| −3.661 | −0.323 |
| −2.183 | 4.174 |
| −1.014 | 8.742 |
| −0.234 | 13.401 |
| −0.037 | 15.773 |
| −0.005 | 18.144 |
| −0.510 | 22.827 |
| −1.071 | 25.139 |
| −1.836 | 27.393 |
| −3.977 | 31.617 |
| −4.658 | 32.603 |
| −5.400 | 33.542 |
| −7.006 | 35.315 |

TABLE XXIV z = −25 mm

| X | Y |
|---|---|
| −22.961 | −27.642 |
| −22.018 | −26.664 |
| −21.095 | −25.669 |
| −19.289 | −23.642 |
| −15.812 | −19.472 |
| −12.680 | −15.049 |
| −9.911 | −10.389 |
| −8.345 | −7.520 |
| −6.615 | −4.030 |
| −5.102 | −0.441 |
| −3.634 | 3.837 |
| −3.014 | 6.011 |
| −2.481 | 8.210 |
| −1.722 | 12.644 |
| −1.476 | 17.128 |
| −1.592 | 19.393 |
| −1.890 | 21.635 |
| −3.064 | 25.986 |
| −3.957 | 28.073 |
| −5.049 | 30.035 |
| −6.358 | 31.855 |
| −7.844 | 33.558 |

TABLE XXV z = −30 mm

| X | Y |
|---|---|
| −4.440 | 6.519 |
| −3.341 | 13.018 |
| −3.243 | 16.316 |
| −3.330 | 17.977 |
| −3.515 | 19.623 |
| −4.193 | 22.849 |
| −4.700 | 24.428 |
| −5.326 | 25.969 |
| −6.933 | 28.834 |
| −8.986 | 31.417 |

TABLE XXVI z = −35 mm

| X | Y |
|---|---|
| −5.258 | 14.085 |
| −5.583 | 18.053 |
| −5.972 | 20.003 |
| −6.524 | 21.926 |
| −8.139 | 25.532 |
| −9.219 | 27.183 |
| −10.437 | 28.755 |

Both prototype and manufactured surfaces resulting from the application of Tables I-IX and Tables X-XXVI may conform to these points within reasonable process tolerances.

Figure 5:
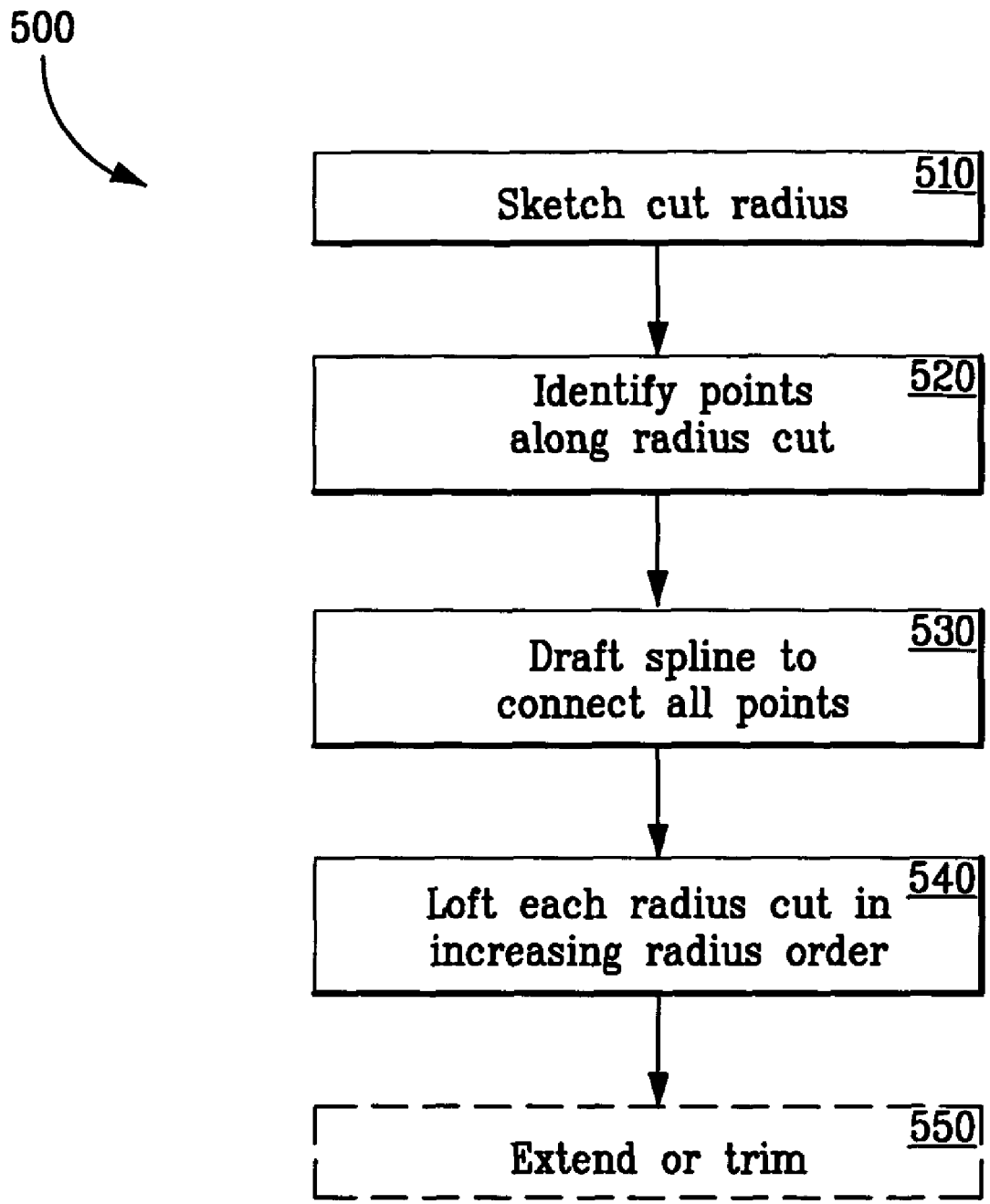
FIG. 5 illustrates an exemplary method for constructing a blade surface according to an embodiment of the present invention.

FIG. 5 illustrates an exemplary method 500 for constructing a blade surface according to an embodiment of the present invention. In step 510, a radius cut is sketched. Points are identified along that radius cut in step 520 and a spline is drafted to connect the aforementioned points in step 530. In step 540, each radius cut sketch is lofted in increasing radius order to form a surface. The surface may be extended or trimmed at the edges to reach the exact desired dimensions in step 550.

Figure 6:
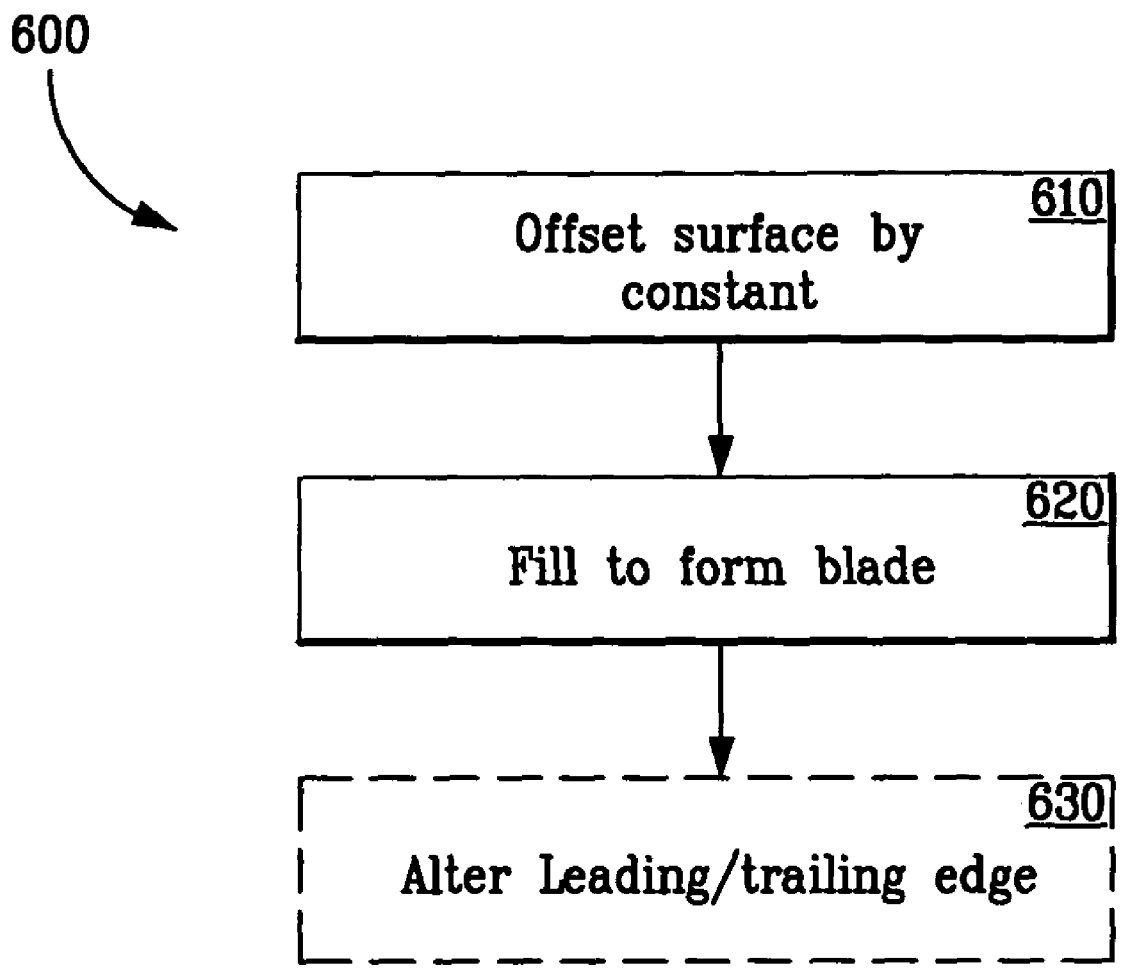
FIG. 6 illustrates a method for forming a blade according to an embodiment of the present invention.

FIG. 6 illustrates a method 600 for forming a blade according to an embodiment of the present invention. In step 610, the surface (as may be created through the method described with respect to FIG. 5) is offset by a constant amount. In step 620, the offset is filled to form a single blade. In optional step 630, the bluntness of the leading and/or trailing edges may be altered for desired operating conditions.

Figure 7:
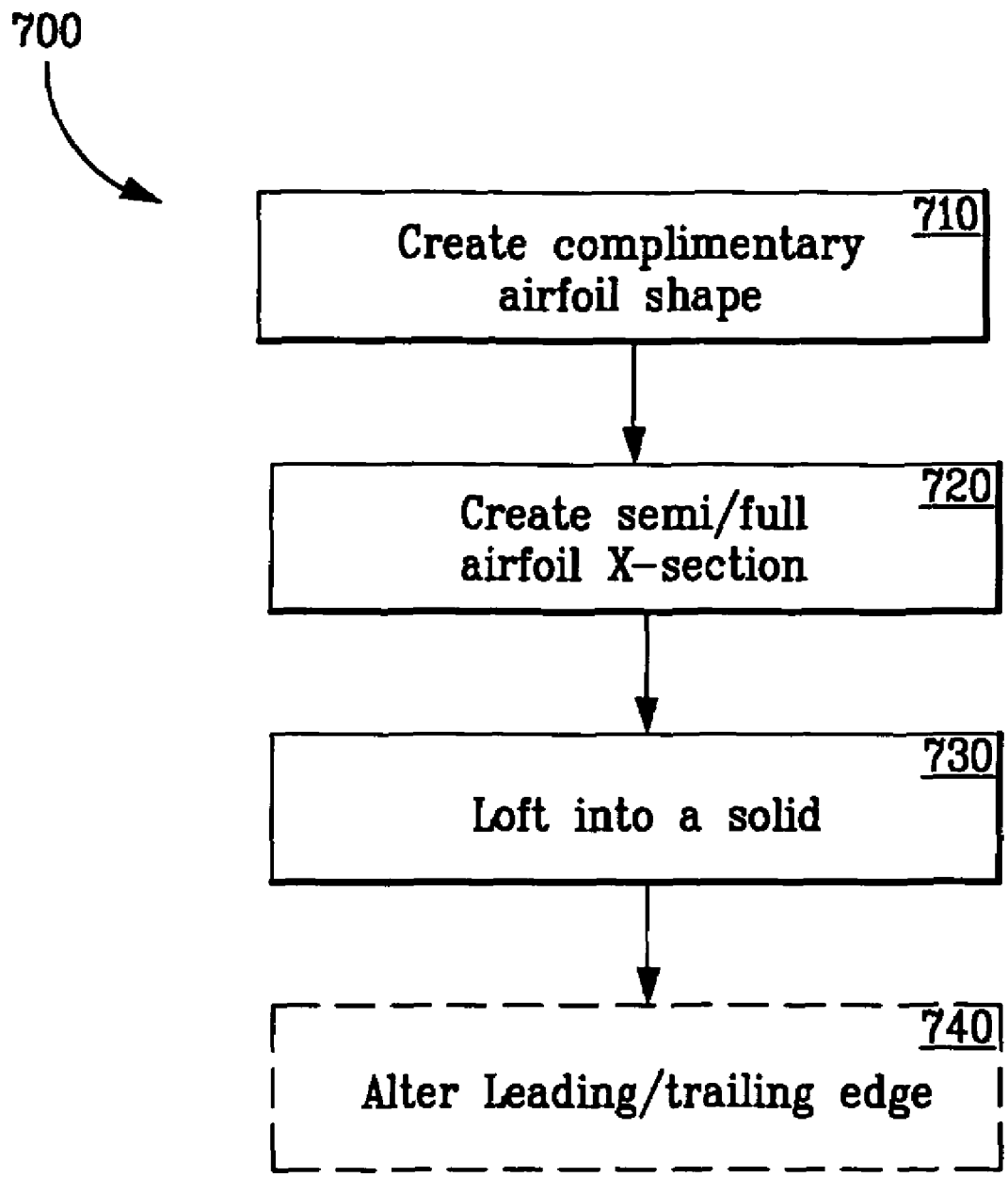
FIG. 7 illustrates an alternative method for forming a blade according to an embodiment of the present invention.

FIG. 7 illustrates an alternative method 700 for forming a blade according to an embodiment of the present invention. In step 710, a complimentary airfoil shape is created. In step 720, a semi- or fully-airfoil blade cross-section is created on one or both sides of the blade. This cross-section may then be lofted into a solid in step 730. Alterations may also be made with respect to the bluntness of the leading and/or trailing edges for the purpose of desired operating conditions in step 740.

Figure 8:
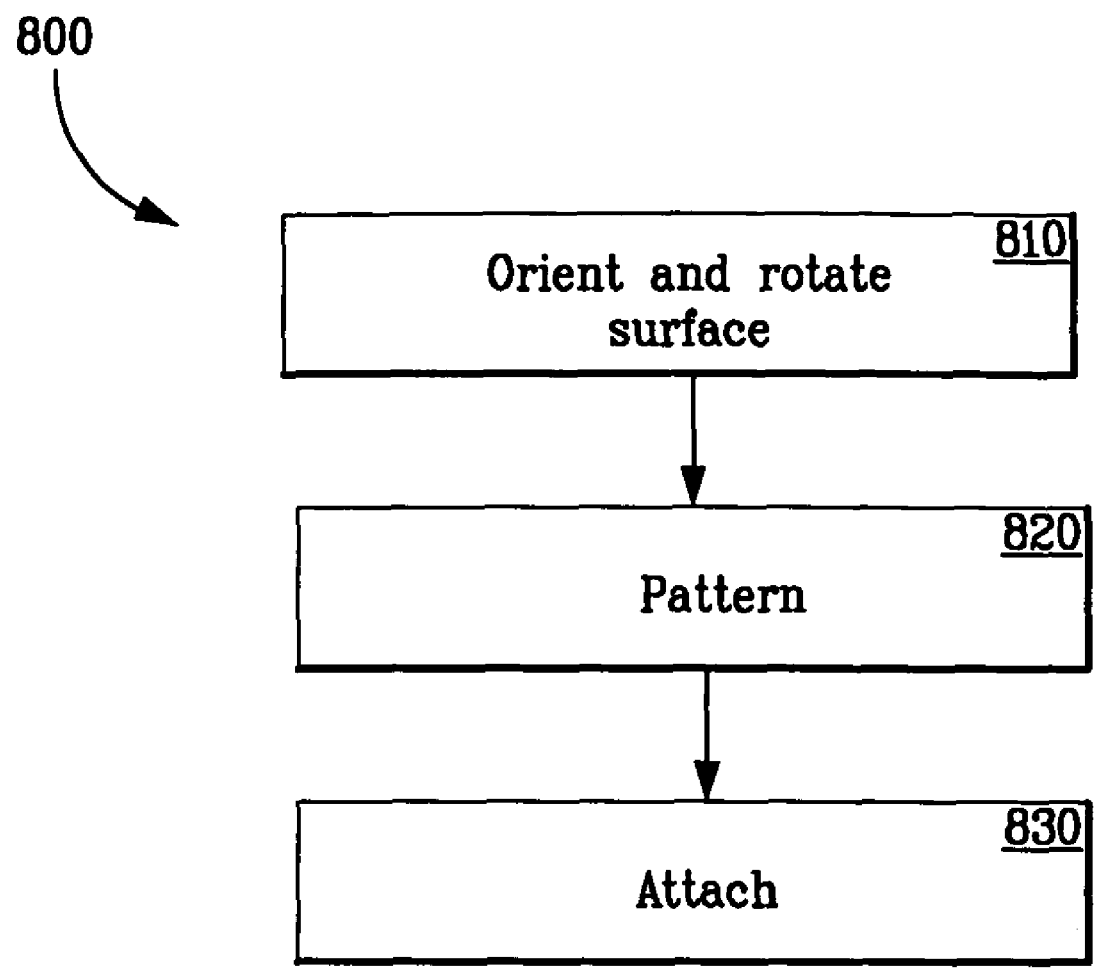
FIG. 8 illustrates an exemplary method for constructing a fan according to an embodiment of the present invention.

FIG. 8 illustrates an exemplary method 800 for constructing a fan according to an embodiment of the present invention. In step 810, blades are oriented with respect to the hub, which may include rotating the in-tact blade surface about an axis to change the pitch, dihedral, or sweep angle as they pertain to desired fan performance. The blade is then patterned around the hub or other fixturing device in step 820 for the appropriate number of blades. Blades can be fully or partially attached to the hub in step 830 and radiused as desired. Alterations may also be made to the leading and/or trailing edge bluntness in order to achieve desired operation conditions.

While Tables I-IX, for example, dictate an 87 mm diameter fan, the blade surface, full blade, and/or final fan may be scaled to change the size and output of the fan as may the measurements set forth in Tables X-XXVI. The resulting fan blade may be mirrored or run in either rotation. Additional attributes may be added to the fan including radii, mid-blade or blade-tip winglets (vertical extrusions out of the blade), full or partial-depth rings, extended or indented turbulators (bumps or cavities along the blade to change boundary layer behavior or noise), embossings, fastening devices, coatings and so forth. Additional surface features and/or strategic roughness may be employed. Furthermore, this blade surface may also be used in a similar fashion to make a non-rotating fan, or stator.

The methods disclosed with respect to FIGS. 5-8 may be embodied in computer software. A computer-readable storage medium may have embodied thereon a program. The program may be executable by a processor to perform the methods or combinations thereof as disclosed herein. These methods may be applicable in the field of computer-aided drafting or design, which may include three-dimensional design tools. The results of such computer-aided drafting and design may be rendered on a display device (e.g., a computer monitor) or printed to a tangible medium such as a computer printout. These results may be annotated with measurement information.

FIGS. 9A-9E illustrate exemplary fans constructed utilizing the surface profile disclosed with respect to FIG. 3. These fan configurations are exemplary and various elements thereof (e.g., hub, blade number, blade configuration, stators) may be interchangeably combined with one another and in conjunction with a particular surface profile to construct a fan in accordance with an embodiment of the present invention.

Figure 9A:
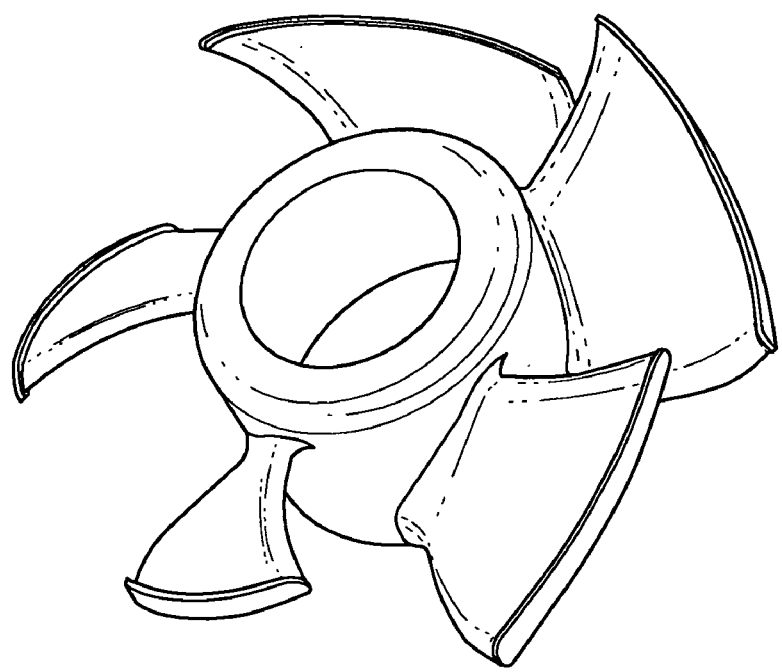
FIGS. 9A-9E illustrate exemplary fans constructed utilizing the surface profile disclosed with respect to FIG. 3.

FIG. 9A illustrates an exemplary fan including five blades arranged about a cylindrical and hollowed hub.

Figure 9B:
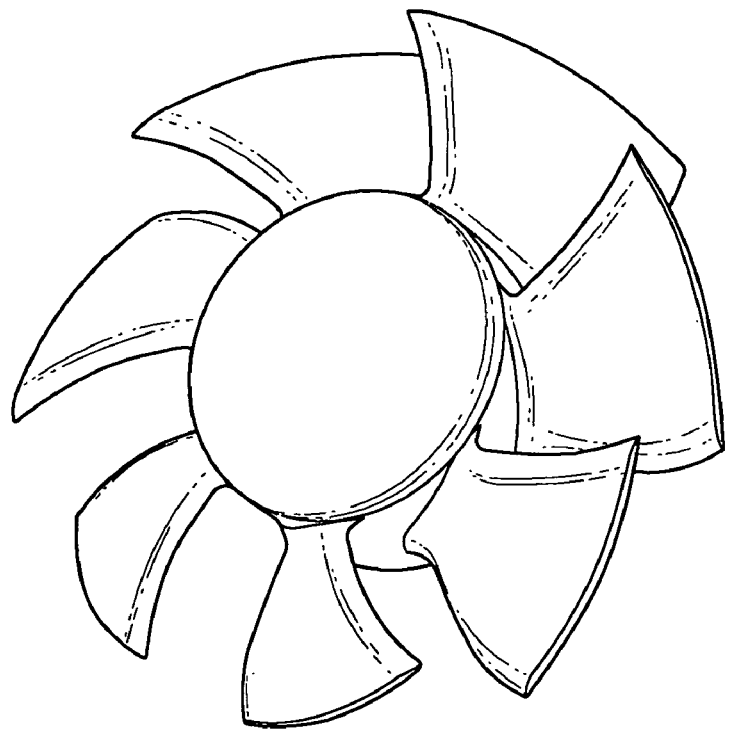

FIG. 9B illustrates another exemplary fan including seven blades arranged about a cylindrical and capped hub.

Figure 9C:
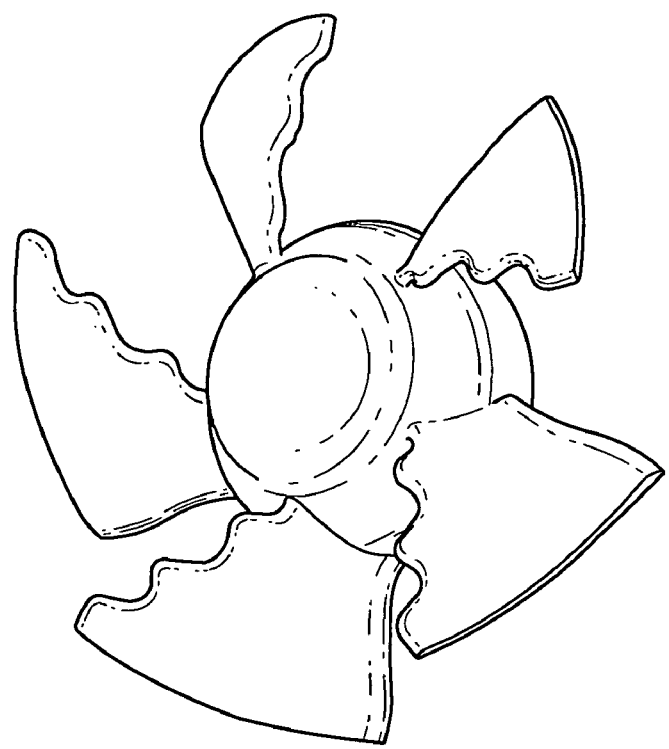

FIG. 9C illustrates an exemplary fan including five blades with serrated edges and arranged about a conical hub.

Figure 9D:
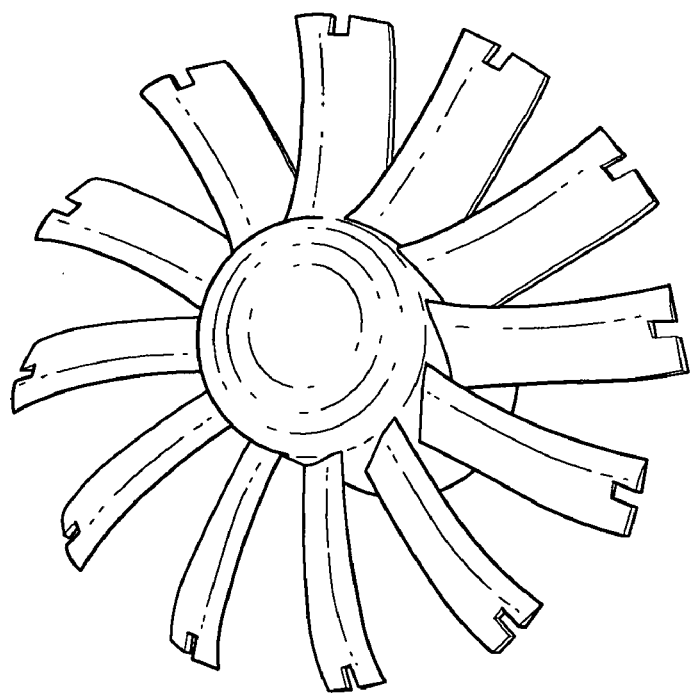

FIG. 9D illustrates an exemplary fan including twelve blades with a notched edge and arranged about a cylindrical and capped hub.

Figure 9E:
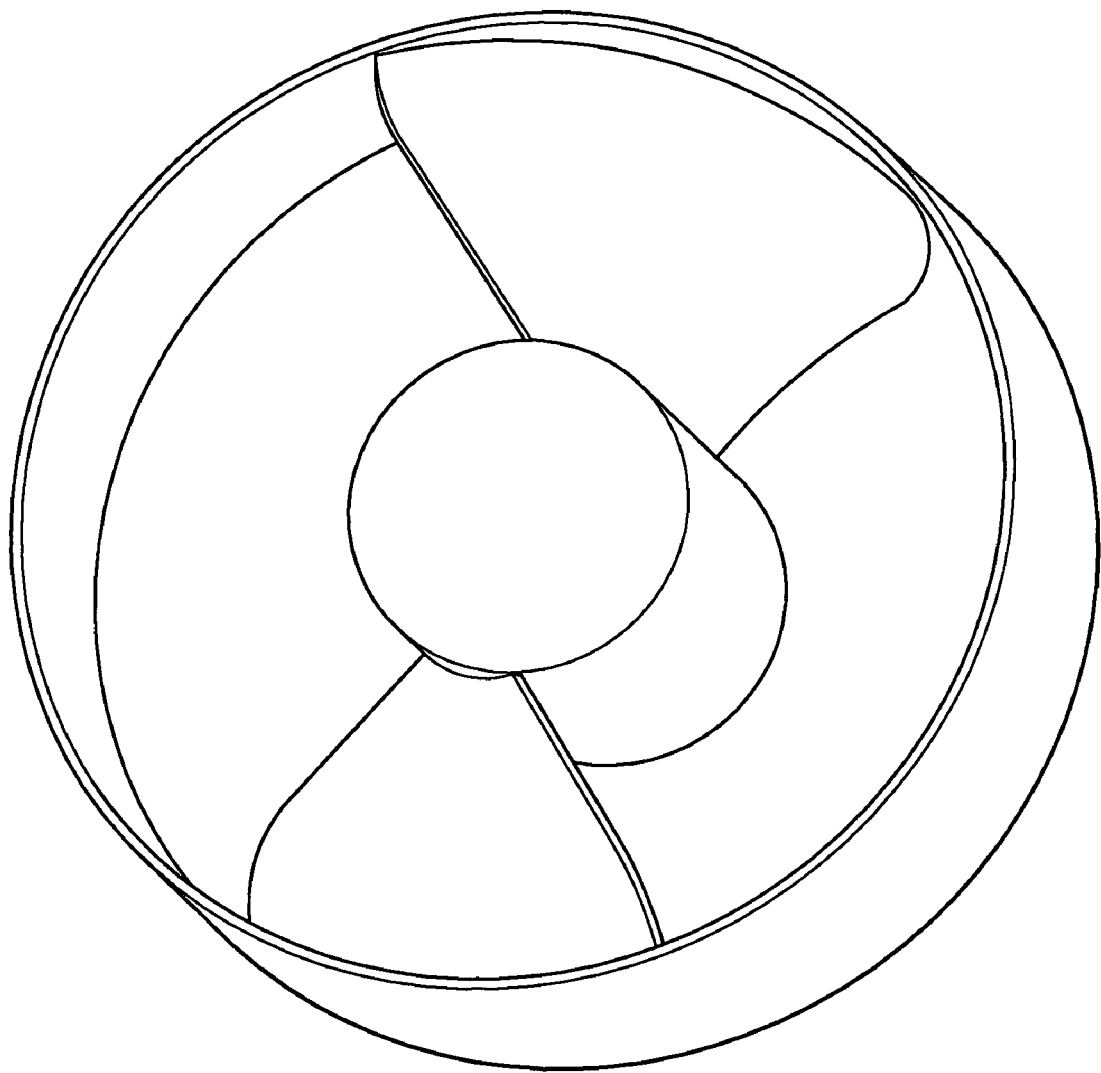

FIG. 9E illustrates an exemplary fan including two blades and arranged about a cylindrical hub, the fan being enclosed within a stator.

FIGS. 10A-10E illustrate exemplary fans constructed utilizing the surface profile disclosed with respect to FIG. 4. These fan configurations are exemplary and various elements thereof (e.g., hub, blade number, blade configuration, stators) may be interchangeably combined with one another and in conjunction with a particular surface profile to construct a fan in accordance with an embodiment of the present invention.

Figure 10A:
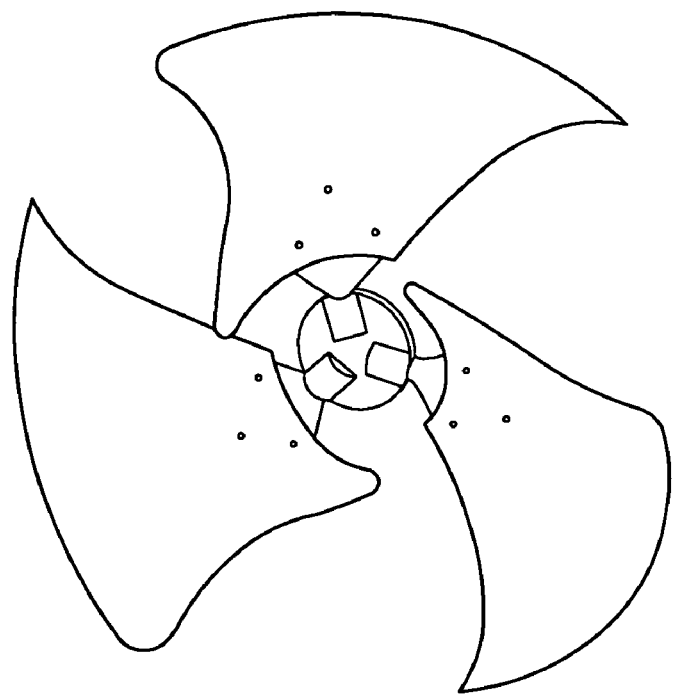
FIGS. 10A-10E illustrate exemplary fans constructed utilizing the surface profile disclosed with respect to FIG. 4.

FIG. 10A illustrates an exemplary fan including three blades extending outward in three-dimensions from an otherwise flat, two-dimensional hub.

Figure 10B:
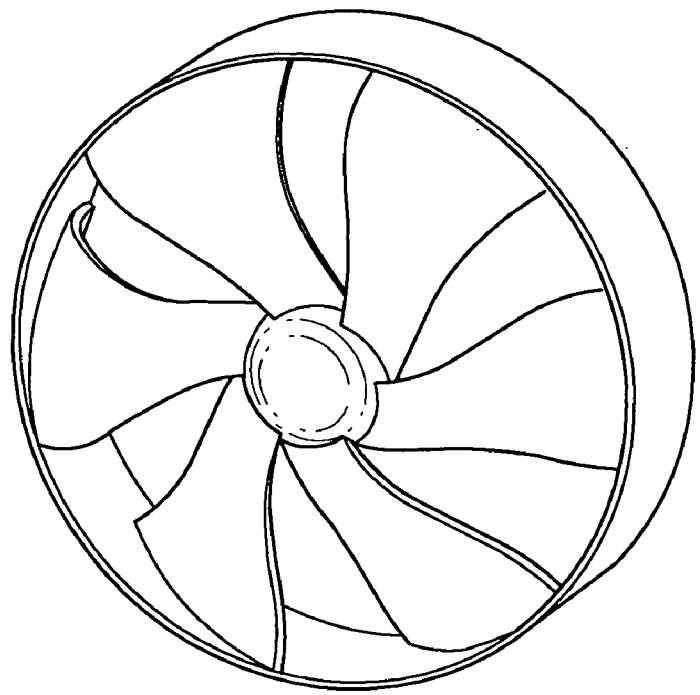

FIG. 10B illustrates an exemplary fan including six blades and arranged about a cylindrical and solid hub, the fan being enclosed within a stator.

Figure 10C:
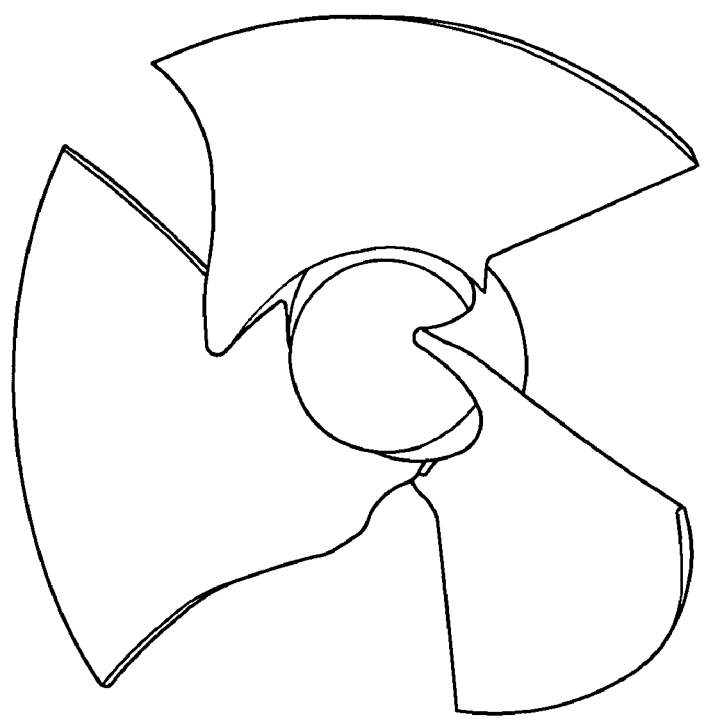

FIG. 10C illustrates an exemplary fan including three blades extending outward in three-dimensions from a conical hub.

Figure 10D:
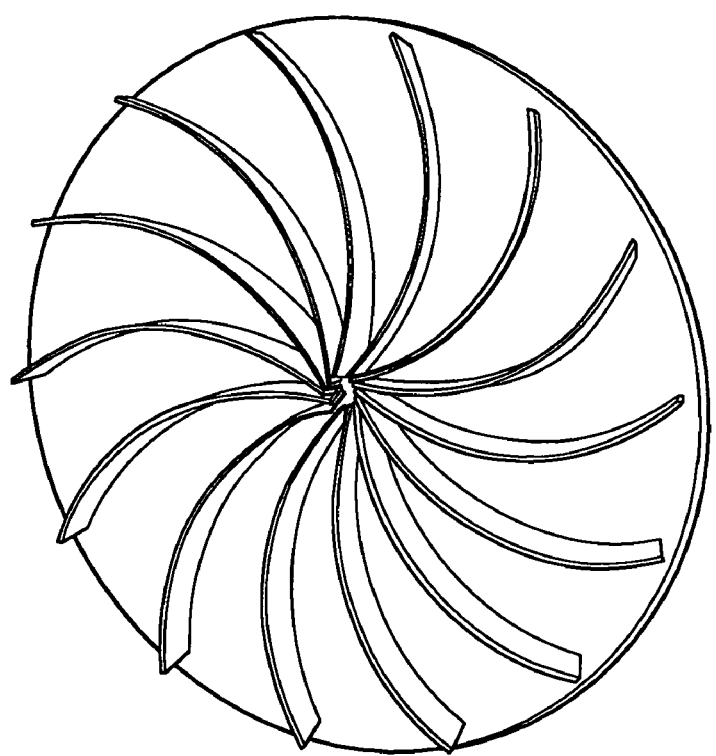
Figure 10E:
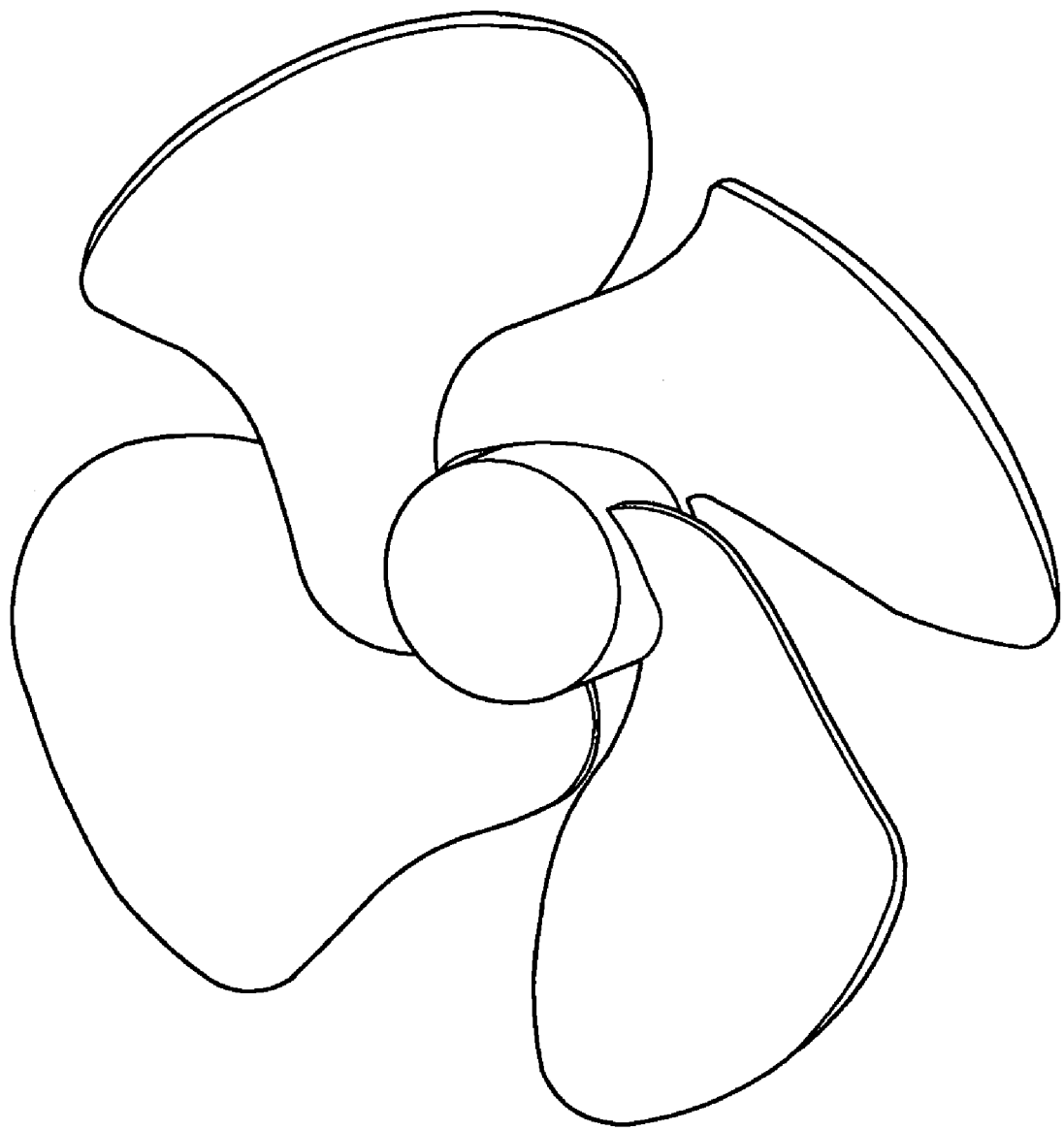

FIG. 10D illustrates an exemplary fan including fourteen blades and arranged about a cylindrical hub, each of the blades being coupled to one another by intermediate 'webbing.'

FIG. 10E illustrates an exemplary fan including four blades and arranged about a cylindrical and solid hub.

While the present invention has been described with reference to exemplary embodiments, it will be understood by those skilled in the art that various changes may be made and equivalents may be substituted for elements or steps thereof without departing from the true spirit and scope of the present invention. For example, methods of design may be applied to methods of manufacture.

What is claimed is:

1. A method for axial fan design, the method comprising:
   executing instructions embodied in a computer-readable storage medium to draft a spline to connect a plurality of points along a radius cut sketch to form a blade surface displayed on a display device, the instructions executed by a processor communicatively coupled to the display device;
   offsetting the blade surface by a constant amount;
   filling the blade surface to form a single blade, the single blade displayed on the display device, wherein a portion of the blade surface conforms to a logarithmic spiral, the radius of the logarithmic spiral unfolding at a constant order of growth when measured at equiangular radii;
   orienting the single blade with respect to a hub on the display device;
   patterning the single blade with a total number of blades to be affixed to the hub around the hub; and
   executing instructions embodied in a computer-readable storage medium to attach the single blade and the remaining blades from the total number of blades to the hub, the instructions executed by a processor, the hub and attached blades displayed on the display device.

2. The method of claim 1, wherein the plurality of points are connected in increasing radius order.

3. The method of claim 1, further comprising executing instructions embodied in a computer-readable storage medium to extend the blade surface at an edge to achieve a desired dimension.

4. The method of claim 1, further comprising executing instructions embodied in a computer-readable storage medium to trim the blade surface at an edge to achieve a desired dimension.

5. The method of claim 1, wherein orienting the single blade includes executing instructions embodied in a computer-readable storage medium to rotate the blade surface about an axis to change a pitch angle, the instructions executed by a processor.

6. The method of claim 1, wherein orienting the single blade includes executing instructions embodied in a computer-readable storage medium to rotate the blade surface about an axis to change a dihedral angle, the instructions executed by a processor.

7. The method of claim 1, wherein orienting the single blade includes executing instructions embodied in a computer-readable storage medium to rotate the blade surface about an axis to change a sweep angle, the instructions executed by a processor.

8. The method of claim 1, wherein the attachment is temporary.

9. The method of claim 1, wherein the attachment is permanent.

10. The method of claim 1, wherein a portion of the blade surface conforms to an internal or external shell configuration from the phylum Mollusca and classes Gastropoda or Cephalopoda.

11. A fan apparatus, comprising:
    a hub; and
    a blade coupled to the hub, the blade including a blade surface, wherein the blade surface is designed by drafting a spline to connect a plurality of points along a radius cut sketch and the blade is designed by offsetting the blade surface by a constant amount and filling the blade surface to form a single blade, wherein a portion of the blade surface conforms to a logarithmic spiral, the radius of the logarithmic spiral unfolding at a constant order of growth when measured at equiangular radii.

12. The fan apparatus of claim 11, wherein the plurality of points are connected in increasing radius order.

13. The fan apparatus of claim 11, wherein the blade surface has been extended at an edge to achieve a desired dimension.

14. The fan apparatus of claim 11, wherein the blade surface has been rotated about an axis with respect to the orientation of the blade surface to the hub.

15. The fan apparatus of claim 14, wherein the rotation about the axis changes a pitch angle, dihedral angle, or sweep angle.

16. A method for axial fan design, the method comprising:
    executing instructions embodied in a computer-readable storage medium to draft a spline to connect a plurality of points along a radius cut sketch to form a blade surface displayed on a display device, wherein a portion of the blade surface conforms to a logarithmic spiral, the radius of the logarithmic spiral unfolding at a constant order of growth when measured at equiangular radii, the instructions executed by a processor communicatively coupled to the display device;
    creating a complimentary airfoil shape;
    lofting the airfoil shape into a solid;
    orienting the solidified blade with respect to a hub, the solidified blade oriented through the execution of computer-readable instructions executed by a processor, the oriented blade displayed on a display device;
    patterning the solidified blade with a total number of blades to be affixed to the hub around the hub; and
    executing instructions embodied in a computer-readable storage medium to attach the solidified blade and the remaining blades from the total number of blades to the hub, the instructions executed by a processor, the hub and attached blades displayed on the display device.

17. The method of 16, further comprising executing computer readable instructions to alter a leading edge or trailing edge bluntness of the blade surface.

18. The method of claim 16, wherein the airfoil shape is created on a first side of the blade surface.

19. The method of claim 16, wherein the airfoil shape is created on the second side of the blade surface.

20. The method of claim 16, wherein the airfoil blade is partially based on the surface.

21. The method of claim 16, wherein the airfoil blade is fully based on the surface.

22. A non-transitory computer-readable storage medium having embodied thereon a program, the program being executable by a processor to perform a method for axial fan design, the method comprising:
    drafting a spline to connect a plurality of points along a radius cut sketch to form a blade surface, wherein a portion of the blade surface conforms to a logarithmic spiral, the radius of the logarithmic spiral unfolding at a constant order of growth when measured at equiangular radii;
    offsetting the blade surface by a constant amount;
    filling the blade surface to form a single blade;
    orienting the single blade with respect to a hub;
    patterning the single blade with a total number of blades to be affixed to the hub around the hub; and
    displaying the single blade and the remaining blades from the total number of blades as being attached to the hub.

23. A non-transitory computer-readable storage medium having embodied thereon a program, the program being executable by a processor to perform a method for axial fan design, the method comprising:
    drafting a spline to connect a plurality of points along a radius cut sketch to form a blade surface, wherein a portion of the blade surface conforms to a logarithmic spiral, the radius of the logarithmic spiral unfolding at a constant order of growth when measured at equiangular radii;
    creating a complimentary airfoil shape;
    lofting the airfoil shape into a solid blade;
    orienting the solidified blade with respect to a hub;
    patterning the solidified blade with a total number of blades to be affixed to the hub around the hub; and
    displaying the solidified blade and the remaining blades from the total number of blades as being attached to the hub.

* * * * *

UNITED STATES PATENT AND TRADEMARK OFFICE
CERTIFICATE OF CORRECTION

| | | |
|---|---|---|
| PATENT NO. | : 8,328,522 B2 | Page 1 of 1 |
| APPLICATION NO. | : 11/906060 | |
| DATED | : December 11, 2012 | |
| INVENTOR(S) | : Jayden David Harman et al. | |

It is certified that error appears in the above-identified patent and that said Letters Patent is hereby corrected as shown below:

Title Page, item (73), Assignee address should be changed from:

Grass Valley, CA to:

San Rafael, CA

Signed and Sealed this
Sixteenth Day of April, 2013

Teresa Stanek Rea
*Acting Director of the United States Patent and Trademark Office*